United States Patent
Masaki et al.

(10) Patent No.: US 6,798,718 B1
(45) Date of Patent: Sep. 28, 2004

(54) SENSOR TIMEPIECE, SENSOR TIMEPIECE DATA INPUT SYSTEM AND METHOD, AND COMPUTER READABLE RECORDING MEDIUM

(75) Inventors: Hiroyuki Masaki, Chiba (JP); Chiaki Nakamura, Chiba (JP)

(73) Assignee: Seiko Instruments Inc., Chiba (JP)

( * ) Notice: Subject to any disclaimer, the term of this patent is extended or adjusted under 35 U.S.C. 154(b) by 0 days.

(21) Appl. No.: 09/958,048

(22) PCT Filed: Apr. 19, 2000

(86) PCT No.: PCT/JP00/02550

§ 371 (c)(1),
(2), (4) Date: Jan. 18, 2002

(87) PCT Pub. No.: WO00/63750

PCT Pub. Date: Oct. 26, 2000

(30) Foreign Application Priority Data

Apr. 19, 1999 (JP) .......................... 11-111370

(51) Int. Cl.⁷ ............................................. G04C 9/00
(52) U.S. Cl. ......................................... 368/1; 368/187
(58) Field of Search ............................. 368/1, 10, 11, 368/185, 187

(56) References Cited

U.S. PATENT DOCUMENTS

| | | | | |
|---|---|---|---|---|
| 4,122,660 A | * | 10/1978 | Canavan | 368/11 |
| 5,644,271 A | * | 7/1997 | Mollov et al. | 331/176 |
| 5,771,180 A | * | 6/1998 | Culbert | 702/130 |
| 5,774,425 A | * | 6/1998 | Ivanov et al. | 368/11 |
| 6,057,769 A | * | 5/2000 | Stevenson | 340/601 |
| 6,545,950 B1 | * | 4/2003 | Walukas et al. | 368/47 |
| 6,625,086 B1 | * | 9/2003 | Kim | 368/21 |
| 2002/0114221 A1 | * | 8/2002 | Stahl | 368/11 |

FOREIGN PATENT DOCUMENTS

| | | | | |
|---|---|---|---|---|
| DE | 3912801 | * | 9/1990 | 368/11 |
| JP | 62047579 | * | 3/1987 | 368/1 |

* cited by examiner

Primary Examiner—Randy W. Gibson
Assistant Examiner—Jeanne-Marguerite Goodwin
(74) Attorney, Agent, or Firm—Adams & Wilks

(57) ABSTRACT

To make calibration of temperature compensation etc. of individual sensor timepieces straightforward, to carry out measurements of physical quantities by each type of sensor in a highly precise manner, to make setting of a time and date for implementing the original timepiece function of the sensor timepiece easy, and to reduce the number of erroneous settings.

A sensor timepiece equipped with a pressure sensor 1 comprises calibration control means for controlling writing of detection values of the pressure sensor 1 to a storage unit 3 in synchronism with external environmental setting control means for controlling an external environment corresponding to physical quantities measured by the pressure sensor 1.

15 Claims, 20 Drawing Sheets

FIG. 4

| PRESSURE (hPa) | SENSOR OUTPUT | AFTER OFFSET ADJUSTMENT | AFTER SPAN ADJUSTMENT |
|---|---|---|---|
| 1060 | 7000 | 3500 | 14000 |
| 840 | 6000 | 2500 | 10000 |
| 620 | 4500 | 1000 | 4200 |
| 400 | 4000 | 500 | 1000 |

| OUTPUT/ TEMPERATURE | -5 | 60 | AFTER TEMPERATURE COMPENSATION |
|---|---|---|---|
| 1060 | 14000 | 16000 | 14000 |
| 840 | 10000 | 12000 | 11000 |
| 620 | 4200 | 6200 | 7200 |
| 400 | 1000 | 3000 | 5000 |

| TEMPERA-TURE | AD COUNT (MINIMUM DC VALUE) | AD COUNT (AFTER DC ADJUSTMENT) |
|---|---|---|
| -5 | 0 | 307 |
| 25 | 100 | 538 |
| 60 | 200 | 850 |

LIGHT

MAGNETISM

SENSOR TIMEPIECE, SENSOR TIMEPIECE DATA INPUT SYSTEM AND METHOD, AND COMPUTER READABLE RECORDING MEDIUM

CROSS-REFERENCE TO RELATED APPLICATIONS

This application is a U.S. national stage application of copending International Application Ser. No. PCT/JP00/02550, filed Apr. 19, 2000, claiming a priority date of Apr. 19, 1999, and published in a non-English language.

TECHNOLOGICAL FIELD

The present invention relates to a sensor timer, sensor timepiece data input system, sensor timepiece data input method, and computer-readable recording medium for recording a program for implementing this method on computer, and more particularly relates to a sensor timepiece, sensor timepiece data input system, sensor timepiece data input method, and computer-readable recording medium for recording a program for implementing this method on computer, where individual calibration such as temperature compensation can be easily carried out for each sensor timepiece, where measurement of physical quantities by each sensor can be performed with a high degree of precision, where setting of a time and a date for implementing the original time function of the sensor timepiece and where incorrect setting can be reduced.

BACKGROUND ART

In recent years, sensor timepieces that are clocks having sensors for measuring various physical quantities such as temperature, pressure, light, magnetism and humidity, etc., built-in, and having a function for displaying and outputting the values measured by the sensors, have been implemented.

For example, in Japanese Patent Publication Laid-open No. 8-15070, there is disclosed a multi-function timepiece having a pressure sensor and a magnetic sensor which is capable of measuring pressure, magnetism and temperature. The magnetic sensor of this multi-function timepiece employs a magnetic resistance element to detect magnetism. On the other hand, the pressure sensor of the multi-function timepiece employs a semiconductor pressure sensor of a bridge of diffused resistances having a piezo-electric resistance effect formed on a diaphragm, but actual measurements taken with the pressure sensor have to be subjected to temperature compensation matching with temperature characteristics which depend on the diffused resistances.

To this end, multi-function timepieces normally have a temperature sensor for temperature compensation built-in. However, the multi-function timepiece described above takes note of the fact that the temperature coefficient for the resistance of the magnetic resistance element within the magnetic sensor is substantially the same as for the temperature range to be measured. A smaller multi-function timepiece can therefore be implemented with high precision by storing temperature data exhibiting the relationship between temperature and resistance when the magnetic resistance element is driven at a constant current in advance as a temperature conversion table, and then carrying out temperature compensation on actual values for the pressure sensor based on this temperature data.

However, output values of typical voltage sensors have individual variations, and when temperature compensation is carried out collectively for a plurality of pressure sensors having different individual temperature characteristics, the precision of values measured by this pressure sensor drops and it is not possible to measure pressure with a high degree of precision.

The precision of the pressure sensor can be maintained, however, by removing variations in the values themselves which are outputted from the pressure sensor so as to increase precision. For example, it is well known to connect resistances with small temperature coefficients in parallel with the bridge resistances so as to increase the precision of the pressure sensor itself.

When resistances with small temperature coefficients are connected in parallel with individual pressure sensors it is necessary to provide elements such as volume resistors etc. for individually adjusting each of these small resistors and the adjustment of these resistors takes up a substantial amount of time and labor.

On the other hand, sensor timepieces having a pressure sensor etc. have an original clock function and it is therefore necessary to set the time and date on this kind of sensor timepiece. Conventionally, this time and date setting operation is carried out manually by a user operating buttons and this takes a substantial amount of time and labor. Setting errors are also common because this is a manual operation.

As the present invention sets out to resolve the aforementioned problems, it is the object of the present invention to provide a sensor timepiece, a sensor timepiece data input system, a sensor timepiece data input method, and a computer-readable recording medium recorded with a program for executing this method on computer, where individual calibration such as temperature compensation can be carried out in a straightforward manner for each sensor, and where physical quantities can be measured in a highly precise manner by each sensor.

Further, it is the object of the present invention to provide a sensor timepiece, a sensor timepiece data input system, a sensor timepiece data input method, and a computer-readable recording medium recorded with a program for executing this method on computer, where setting of the time and a date in order to implement the original timepiece function of the sensor timepiece can be carried out in a straightforward manner and where the number of erroneous settings is reduced.

DISCLOSURE OF THE INVENTION

In order to achieve the aforementioned objects, a sensor timepiece of the present invention equipped with at least one sensor comprises calibration control means for controlling writing of detection values of the sensor to memory in synchronism with external environmental setting control means for controlling an external environment corresponding to physical quantities to be measured by the sensor.

According to this sensor timepiece, detection data peculiar to individual sensor timepieces corresponding to the environment is automatically stored in advance in memory by the calibration control means and the load on the adjustment process is alleviated. With the sensor timepiece of the present invention, the calibration control means exerts control so as to write the sensor detection values to memory so as to correspond to a plurality of temperature information.

According to this sensor timepiece, data useful in temperature compensation can be automatically stored in memory, which makes the later generation of temperature compensation data straightforward.

The sensor timepiece of the present invention also comprises operation control means for generating temperature compensation data based on the data written to the memory, and current temperature data and sensor detection values, and converting the sensor detection values to physical quantities for output.

According to this sensor timepiece, the operation control means generates temperature compensation data and the sensor detection values are converted to physical quantities and outputted based on this temperature compensation data so the highly precise compensated output suited to individual sensor characteristics can be acquired.

The sensor timepiece of the present invention can also be equipped with mode control means for controlling switching over between an operation mode for performing normal operations including conversion and output of physical quantities by the operation control means and a calibration mode where the calibration control means performs calibration operations.

According to this sensor timepiece, the mode control means controls switching over between an operation mode for performing normal operations including conversion and output of physical quantities by the operation control means and a calibration mode where the calibration control means performs calibration operations and normal operation and a calibration process can therefore easily be performed with individual timepieces.

The sensor of the present invention can also be provided with time/date setting means, taking detection signals detected by the sensor(s) as input, and setting a time and/or a date based on the inputted detection signals.

According to this sensor timepiece, the time/date setting means, takes detection signals detected by the sensor(s) as input, and sets a time and/or a date based on the inputted detection signals.

With the sensor timepiece of the present invention, the time/date setting means, in parallel with the calibration operation by the calibration control means or before and/or after the calibration operation, generates time and/or date data based on a signal detected by the sensor, and sets the time and/or date.

According to this sensor timepiece, the time/date setting means, in parallel with the calibration operation by the calibration control means or before and/or after the calibration operation, generates time and/or date data based on a signal detected by the sensor, and sets the time and/or date.

Further, the sensor timepiece of the present invention equipped with at least one sensor can further comprise time/date setting means, taking detection signals detected by the sensor(s) as input, and setting a time and/or a date based on the inputted detection signals.

According to this sensor timepiece, the time/date setting means takes detection signals detected by the sensor(s) as input and sets a time and/or a date based on the inputted detection signals.

The sensor timepiece of the present invention may also have mode control means having mode setting means for setting a mode for setting a time and/or a date, with the time/date setting means generating time and/or date data based on detection signals detected by the sensor(s) when a mode is set by the mode setting means, and setting a time and/or date.

According to this sensor timepiece, the mode setting means sets a mode for setting a time and/or a date, and the time/date setting means generates time or date data based on detection signals detected by the sensor when a mode is set by the mode setting means.

Further, a sensor timepiece data input system of the present invention comprises a sensor timepiece equipped with an external environmental setting control device for controlling setting of an external environment, at least one sensor, and calibration control means for controlling writing of detection values of the sensor to memory in synchronism with changes in physical quantities of an external environment set and controlled by the external environmental setting control.

According to this sensor timepiece data input system, the external environmental setting control device controls the setting of the external environment, and the sensor timepiece calibration control means ensures that detection values of the sensor are written to memory automatically in synchronism with changes in physical quantities, the setting of which is controlled by the external environmental setting control device.

Further, the sensor timepiece data input system of the present invention can comprise at least one sensor, and time/date setting means, taking detection signals detected by the sensor(s) as input, and setting a time and/or a date based on the inputted detection signal(s), and control means for controlling at least one physical quantity of physical quantities measured using the sensor timepiece based on the set time and date, and setting the time and date of the sensor timepiece.

According to this sensor timepiece data input system, the control means controls at least one of the physical quantities measured by the sensor timepiece based on the set time and date and sets the time and date of the sensor timepiece, and the sensor timepiece time/date setting means takes detection signals detected by the sensor as input and sets the time and data based on the inputted detection signals.

Further, a sensor timepiece data input method of the present invention includes the steps of: controlling writing of detection values detected by a sensor to memory in synchronism with changes in physical quantities of an external environment set and controlled by an external environmental setting control device; and generating compensation data from the contents of the memory and current detection values of the sensor and compensating for the physical quantities of the sensor.

According to this sensor timepiece data input method, in the writing step, detection values for physical quantities detected by individual sensors are automatically written to memory in synchronism with changes in physical quantities of the external environment controlled by the external environmental setting control device. Further, generation of compensation date and compensation of physical quantities detected by the sensors is carried out in a calculating step.

Further, a sensor timepiece data input method of the present invention comprises the steps of: controlling at least one physical quantity of physical quantities measured using the sensor timepiece based on a set time and date; detecting physical quantities controlled by the physical quantity control step on the sensor timepiece side; and setting a time and data of the sensor timepiece on the sensor timepiece side based on detection results of the detection step.

Here, control is exerted in the physical quantity control step in such a manner that at least one of the physical quantities measured by the sensor is measured based on the set time and date. The physical quantity controlled in the physical quantity control step is then detected on the sensor timepiece side in the detection step. The time and date are then set on the sensor timepiece side based on the detection results of the detection step in the time/date setting step.

Moreover, a program for executing the aforementioned methods is recorded on a computer-readable recording medium of the present invention.

BRIEF DESCRIPTION OF THE DRAWINGS

FIG. 4 is a view showing an example of pressure sensitivity adjustment occurring during calibration.

BEST MODE FOR CARRYING OUT THE INVENTION

Figure 1:
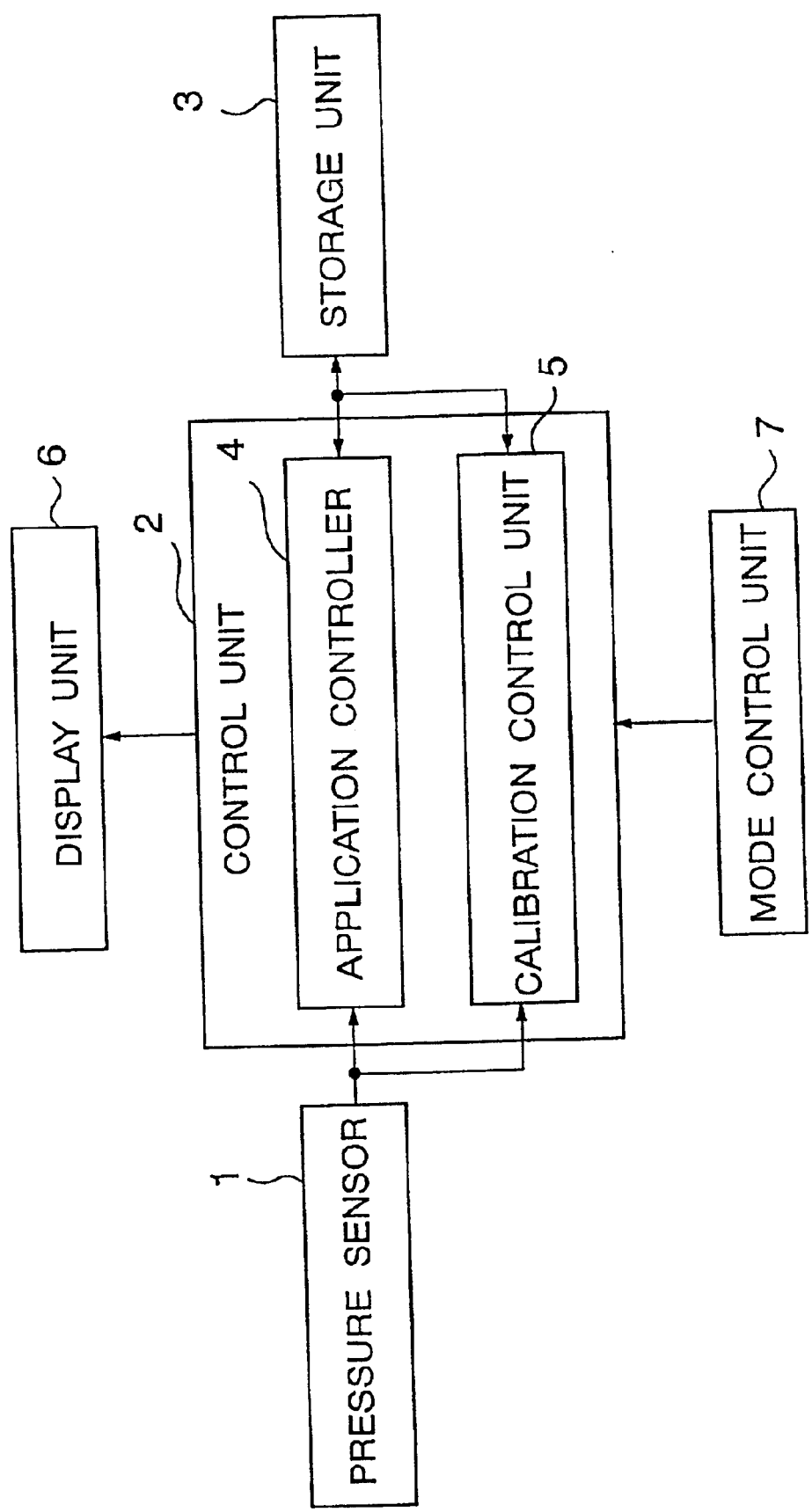
FIG. 1 is a block diagram showing a configuration of a sensor timepiece of a first embodiment.
Figure 2:
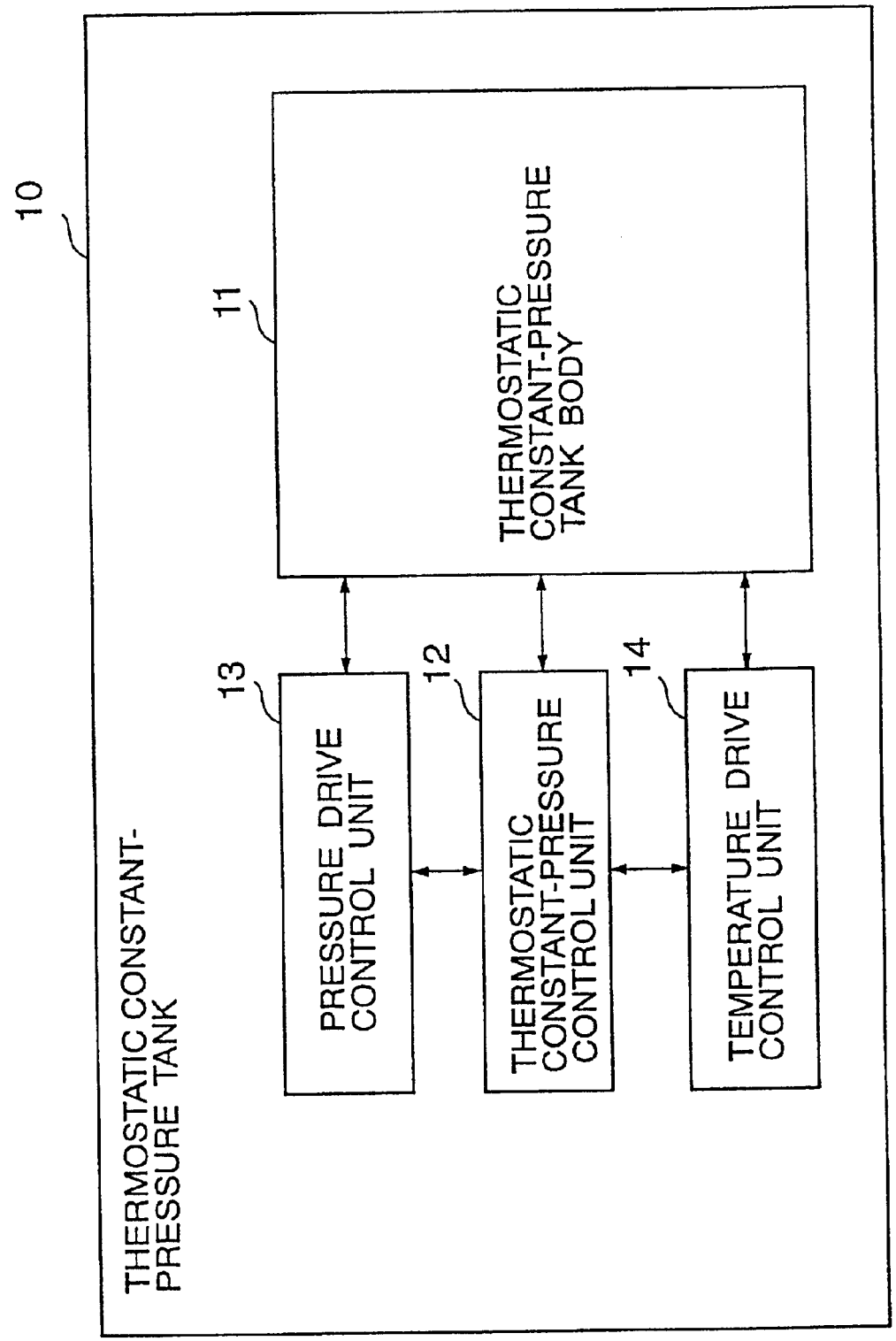
FIG. 2 is a block diagram showing a thermostatic constant-pressure tank employed in a process for manufacturing the sensor timepiece of the first embodiment.

The following is a detailed description, with reference to the appended drawings, of preferred embodiments of a sensor timepiece, sensor timepiece data input system, sensor timepiece data input method, and computer-readable recording medium for recording a program for implementing this method on computer First Embodiment FIG. 1 is a block diagram showing a configuration of a sensor timepiece of a first embodiment of the present invention. The sensor timepiece in FIG. 1, in addition to a clock function, has a pressure sensor 1 for measuring pressure constituting a physical quantity of the environment surrounding the timepiece. A controller 2 comprises an application controller 4 for incorporating programs for carrying out control of normal operations such as displaying a physical quantity such as a pressure value detected by the pressure sensor 1 or a time produced by the clock function (not shown) at a display unit 6, and a calibration control unit 5 incorporating programs for controlling correction (calibration) of pressure values detected by the pressure sensor 1. A storage unit 3 consists of read/writable non-volatile memory and is for storing detection values of the pressure sensor 1 acquired by the calibration control unit 5. A mode controller 7 is for controlling changing over between an application for controlling normal operations of the application controller 4 using the application controller 4 by operation of buttons (not shown) and a calibration mode for performing calibration operation control using the calibration control unit 5. The display unit 6 displays physical quantities such as pressure, etc., time, and various operating conditions, and is implemented using an LCD, etc. The pressure sensor 1 is a semiconductor pressure sensor for measuring pressure based on changes in bridge resistances located on a diaphragm and can also measure temperature using the temperature characteristics of the bridge resistances, as is described later. On the other hand, FIG. 2 is a block view showing the configuration of a thermostatic constant-pressure tank 10 used during calibration of the sensor timepiece shown in FIG. 1. In FIG. 2, the thermostatic constant-pressure tank 10 comprises thermostatic constant-pressure tank body 11 within which a sensor timepiece to be calibrated is located, a thermostatic constant-pressure control unit 12 for controlling the environmental conditions within the thermostatic constant-pressure tank body 11, a pressure drive control unit 13 for controlling driving of a vacuum pump and compressor (not shown) under the instruction of the thermostatic constant-pressure control unit 12 and for controlling pressure within the thermostatic constant-pressure tank body 11, and a temperature drive control unit 14 for controlling temperature within the thermostatic constant-pressure tank body 11. The thermostatic constant-pressure control unit 12 controls repeating of a pressure cycle and temperature cycle described later.

Figure 3:
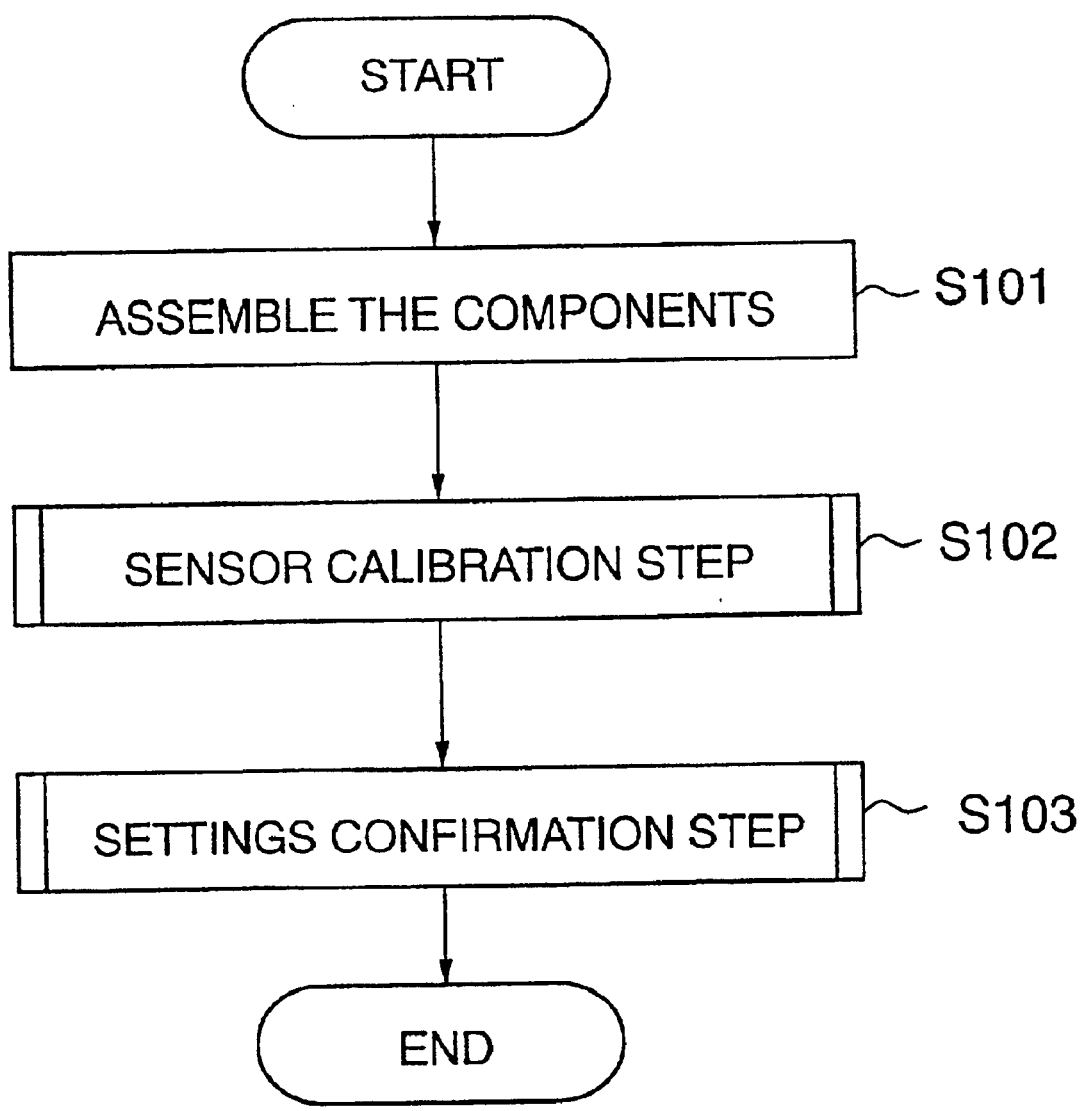
FIG. 3 is a flowchart of a manufacturing process of the first embodiment.

A description is now given with reference to a flowchart shown in FIG. 3 of a method of manufacturing the sensor timepiece shown in FIG. 1. In FIG. 3, first, after the sensor timepiece has been assembled completely (step S101), a calibration process for calibrating the pressure sensor 1 is executed (step S102). This calibration process is described later, however, the sensor timepiece is set to calibration mode by the mode control unit 7, the calibration control unit 5 is put into an operating state, and the sensor timepiece is arranged within the thermostatic constant-pressure tank body 11. The thermostatic constant-pressure control unit 12 then repeats a prescribed temperature cycle and pressure cycle. On the other hand, the changes in the temperature cycle and pressure cycle are detected by the pressure sensor 1, and the calibration control unit 5 then executes a process to write sensor output values corresponding to the temperature of the pressure sensor 1 based on a calibration program which is based on the detection results. After this, detection is performed using the pressure sensor 1 under the same environmental conditions as at the time of calibration, a setting confirmation process to confirm whether or not detection values attained using the calibration data stored in the storage unit 3 are accurate (step S103), and then the process ends.

A description is now given of the concept behind calibration of the pressure sensor 1. The pressure sensor 1 has individual variations in both sensitivity (span) and offset, i.e. the output sensitivity and offset of each output sensor built-into each sensor timepiece is different and individual output sensitivity and offset adjustment is therefore required. The pressure sensor 1 shown in FIG. 1 also measures temperature but requires sensitivity adjustment due to measuring temperature utilizing the temperature characteristics of a piezo resistance.

Figure 5:
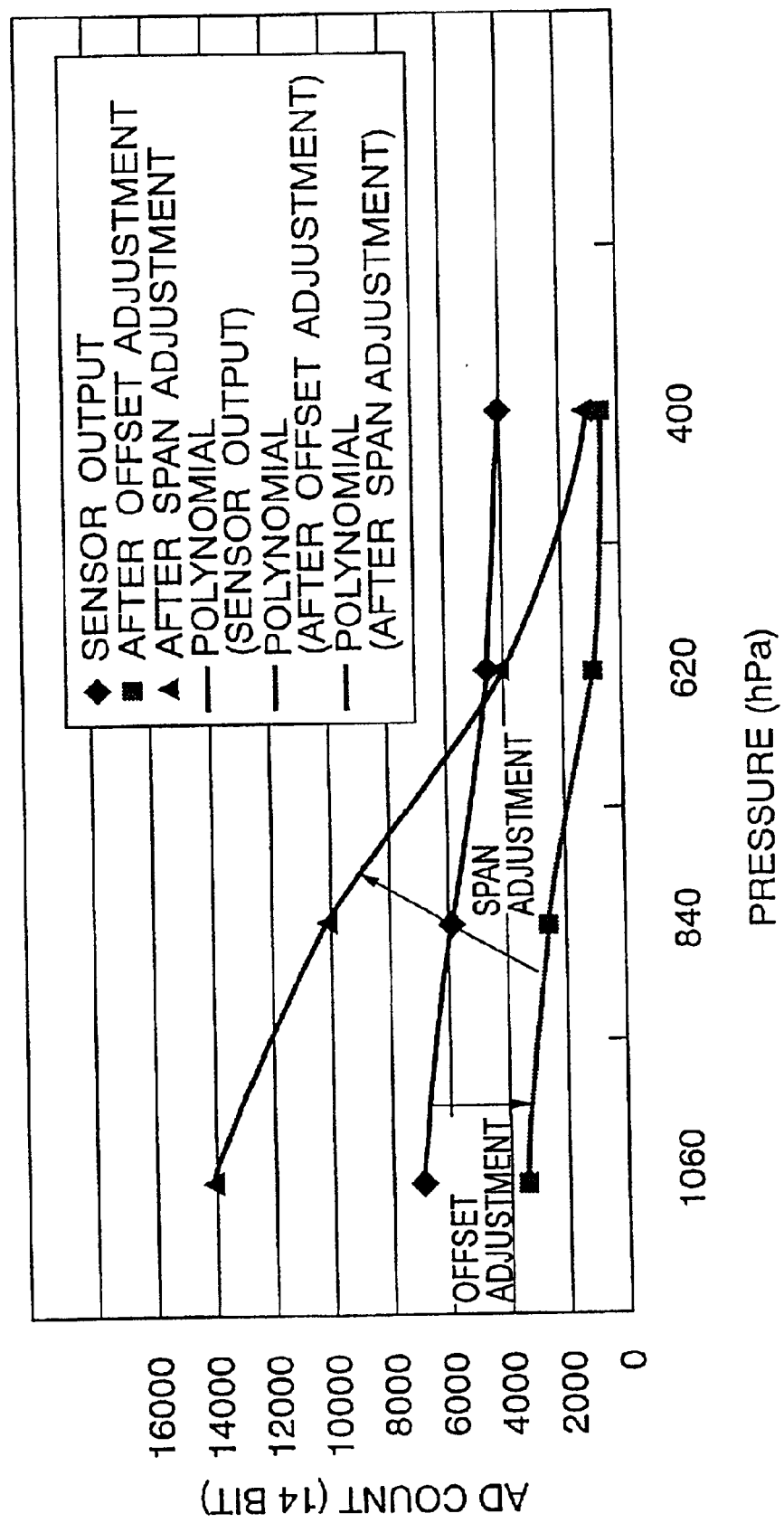
FIG. 5 is a graph illustrating the pressure sensitivity adjustment shown in FIG. 4.

First, a description is given of pressure sensitivity adjustment. In this pressure sensitivity adjustment, offset adjustment is carried out under conditions at the lowest pressure of the measuring range, after which span adjustment is carried out under conditions at the uppermost measuring range. FIG. 4 is a view showing values for after offset adjustment and span adjustment of the sensor output under different pressure conditions, and FIG. 5 shows FIG. 4 in the form of a graph. Each of the values for the sensor output for after offset adjustment and after span adjustment are shown as count values of an AD converter (not shown) with it being taken that there is no change in temperature.

The offset adjustment and span adjustment shown in FIG. 4 and FIG. 5 are in line with AD count value occurring under the uppermost pressure and under the lowermost pressure. For example, polynomial approximation is carried out by matching an AD count value to approximately "1000" under an environment at a minimum pressure of 400 hPa, and matching the AD count value to approximately "14000" under an environment at a maximum pressure of 1060 hPa, so that pressure sensitivity adjustment can be carried out at a fixed temperature.

Figure 6:
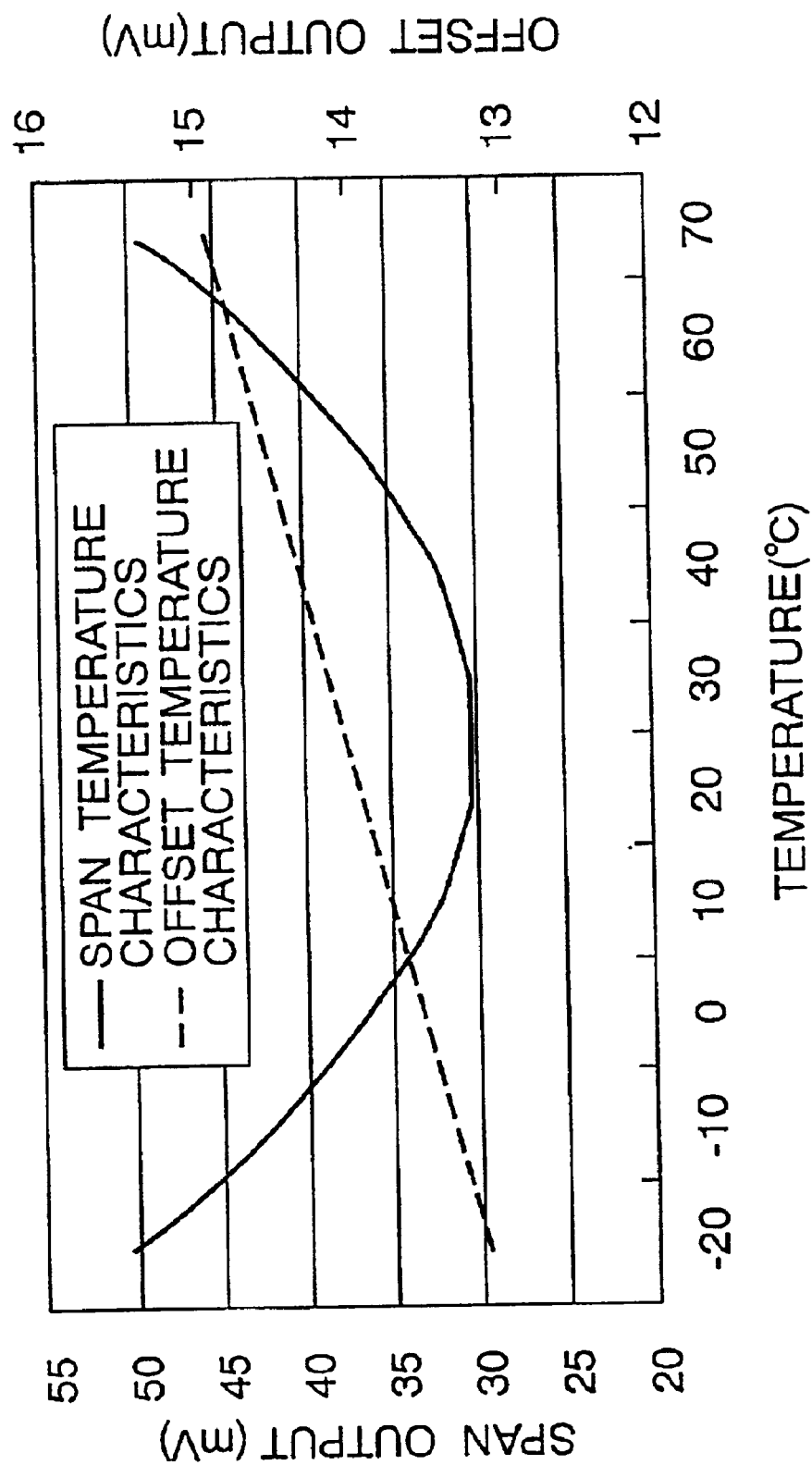
FIG. 6 is a view showing temperature characteristics of the offset and span of a pressure sensor.

The offset and span have the temperature characteristics shown in FIG. 6 as a result of the pressure sensor employing a piezo resistance, and it is therefore necessary to carry out pressure compensation in accompaniment with the changes in temperature. In this pressure/temperature compensation, pressure sensitivity adjustment is first carried out under, for example, the lowermost temperature under the fixed temperature described above. After this, fine adjustment of span is carried out in an environment of a different temperature so that the AD count corresponding with the maximum pressure of the measured range coincides with the AD count corresponding with the maximum pressure of the measured range under the maximum temperature environment.

Figures 7, 8:
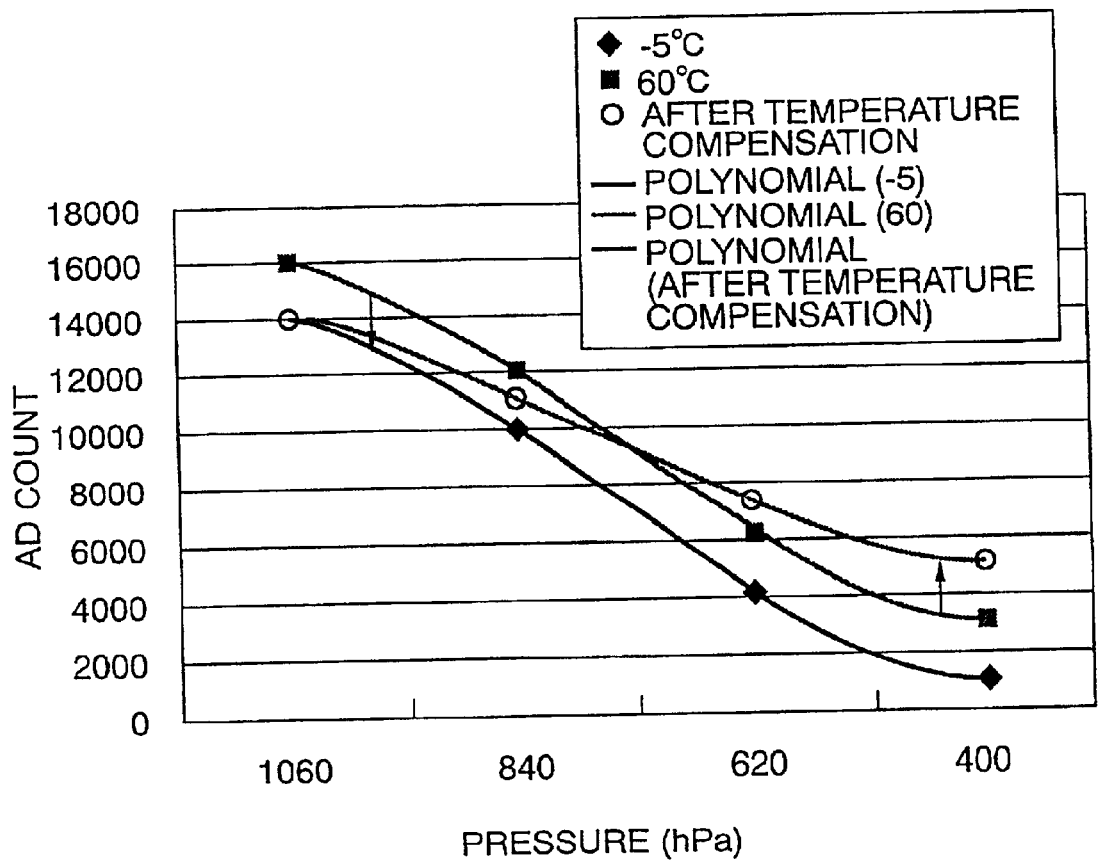
FIG. 7 is a view showing an example of pressure/temperature compensation occurring during calibration.
FIG. 8 is a graph illustrating the pressure/temperature compensation shown in FIG. 7.

FIG. 7 is a view showing an example of pressure/temperature compensation, and FIG. 8 shows the pressure/temperature compensation shown in FIG. 7 in the form of a graph. FIG. 7 and FIG. 8 show the transition of the AD count and the temperature compensation (fine adjustment of span) occurring at 60° C. at the maximum temperature after pressure sensitivity adjustment is carried out at the lowest temperature of −5°C. The AD count of the pressure at a temperature of 60° C. (maximum temperature) and a pressure of 1060 hPa (maximum pressure) becomes "16000" due to the offset temperature characteristics. This AD count "16000" is then lined up with "14000". The pressure/temperature compensation is then realized by matching up 1060 hPa (the maximum pressures) with the AD count "14000" under all environments so as to obtain compensation data for the pressure data of the pressure sensor 1.

Figure 9:
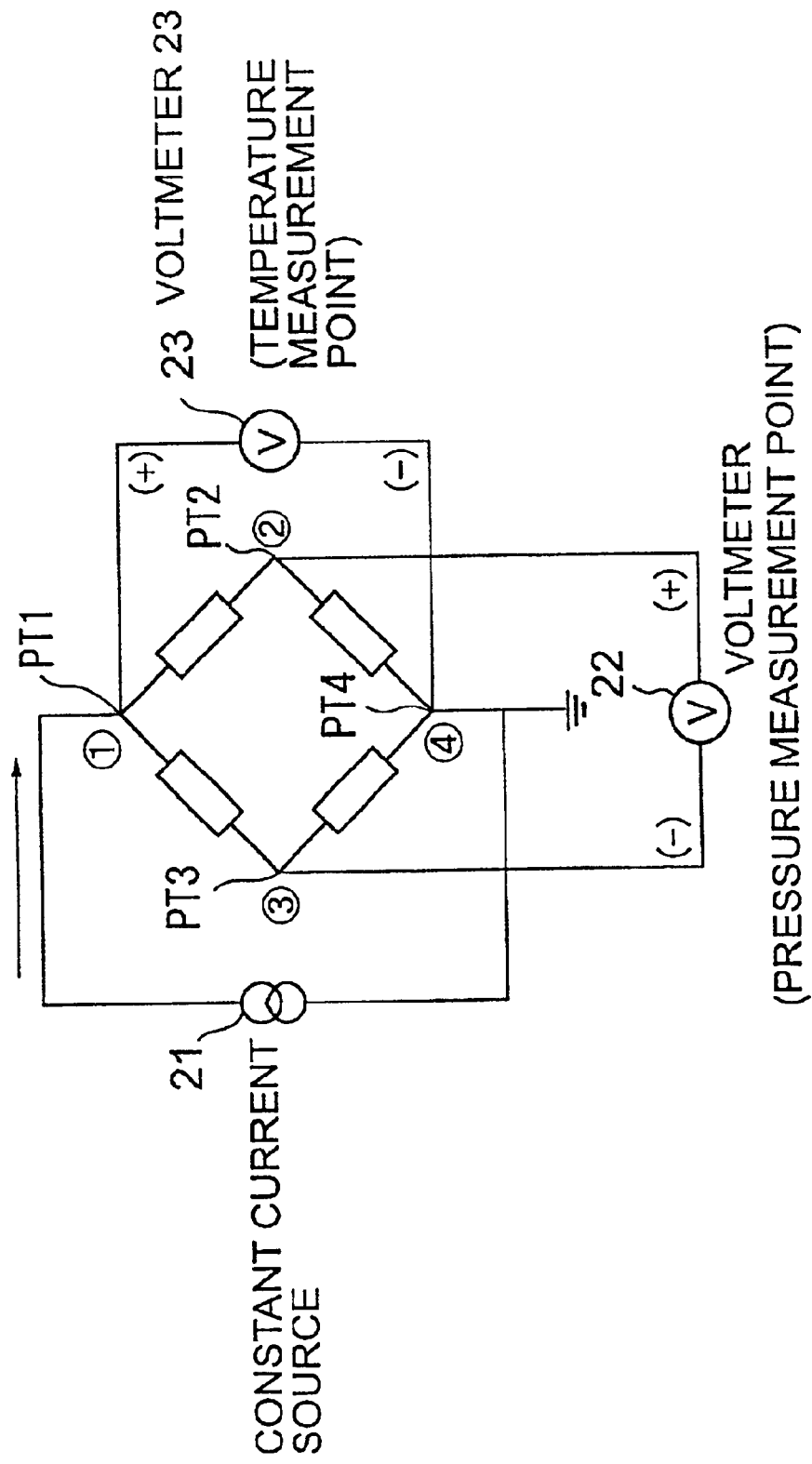
FIG. 9 is a block diagram showing a circuit configuration for the pressure sensor.

Next, a description is given of temperature sensitivity adjustment for the case of using the pressure sensor 1. As described above, the temperature is measured by utilizing the temperature characteristics of the bridge resistances of the pressure sensor 1. FIG. 9 shows a circuit configuration for the pressure sensor 1. As shown in FIG. 9, a constant current is applied to the bridge from a constant current source 21 and a change in voltage across connection points PT1 and PT4 measured by a voltmeter 23 is converted to a temperature. However, humidity sensitivity adjustment is necessary due to individual irregularities in the resistor bridge. Pressure is obtained by converting changes in voltage across connection points PT2 and PT3 measured by a voltmeter 22 into pressure.

Figures 10, 11:
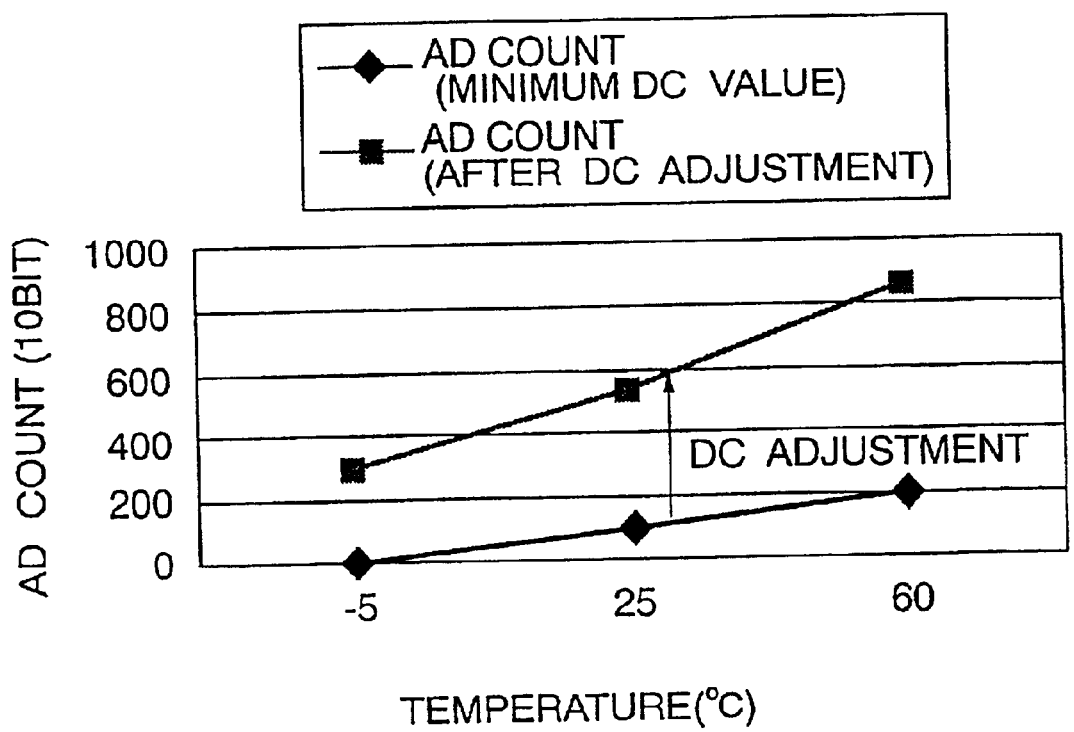
FIG. 10 is a view showing an example of temperature sensitivity adjustment occurring during calibration.
FIG. 11 is a graph illustrating the temperature sensitivity adjustment shown in FIG. 10.

The pressure sensitivity adjustment is performed under the lowermost temperature until the desired AD count is obtained, and is carried out by gradually raising the current of the constant current source 21 and then obtaining the AD count for each temperature after this current adjustment. FIG. 10 is a view showing an example of an AD count during temperature sensitivity adjustment, and FIG. 11 shows the temperature sensitivity adjustment shown in FIG. 10 in the form of a graph. In FIG. 10 and FIG. 11, for example, the current at the lowermost temperature of −5° C. is gradually raised until the desired AD count of "300" is given. After this, an AD count is obtained for each temperature, i.e. −5° C., 25° C. and 60° C., and adjustment is complete.

Figure 12:
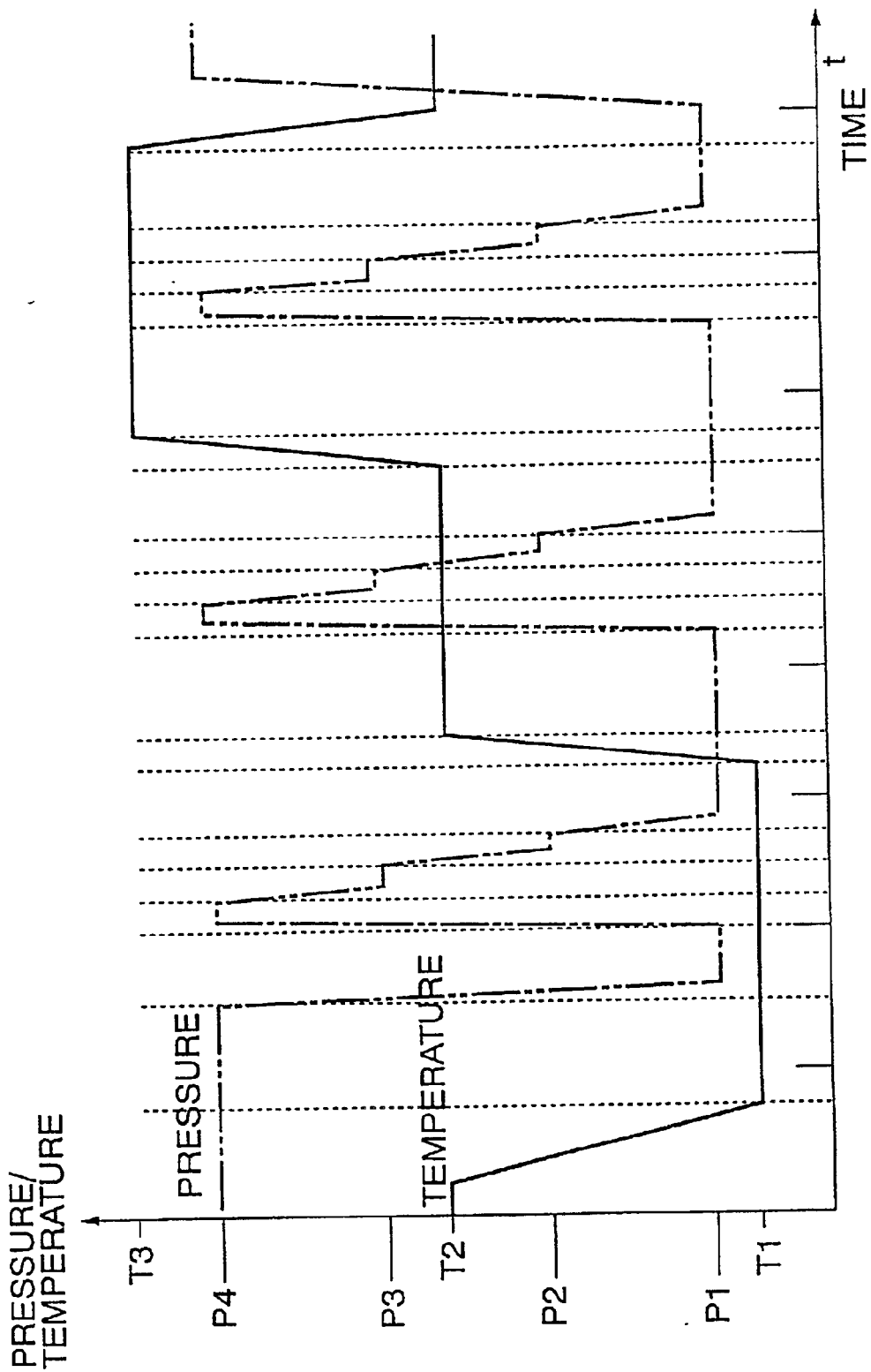
FIG. 12 is a timing chart showing the control of temperature and pressure during calibration by the thermostatic constant-pressure control unit.

When carrying out calibration including pressure sensitivity adjustment, pressure/temperature compensation, and temperature sensitivity adjustment, the pressure sensor 1 of the sensor timepiece located within the thermostatic constant-pressure tank body 11 can detect pressure instantaneously but it takes some time for the temperature to become constant. The temperature cycle and pressure cycle shown in FIG. 12 are therefore set and controlled. This setting and control is performed by the thermostatic constant-pressure control unit 12. Namely, the pressure is changed at each temperature so as to give a cycle where the temperature changes little. In FIG. 12, four points are selected for the pressure and three points are selected for the temperature. However, much more precise compensation data is generated for a larger number of measuring points.

Figure 13:
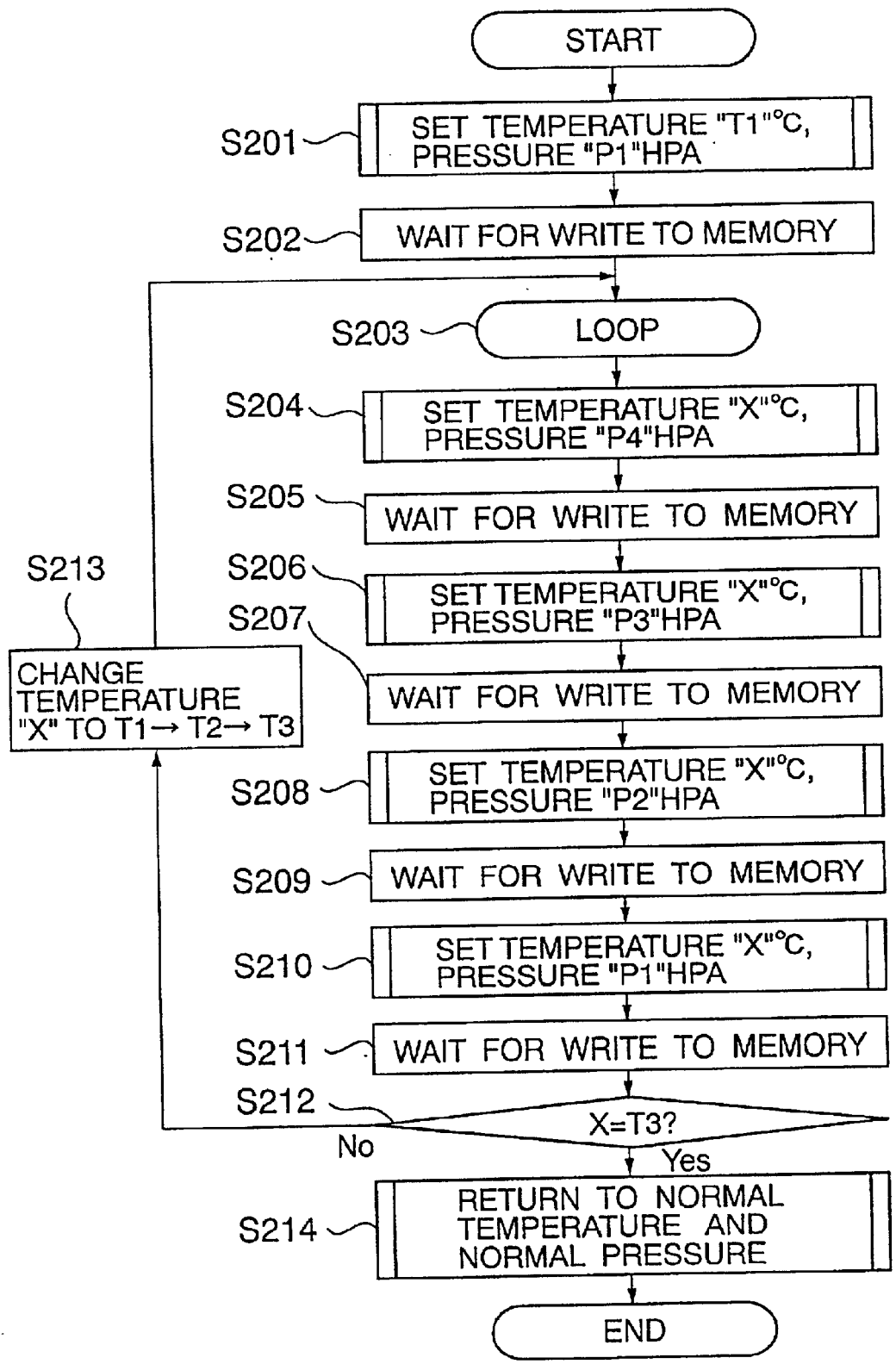
FIG. 13 is a flowchart showing a control processing procedure of the thermostatic constant-pressure control unit.
Figure 14:
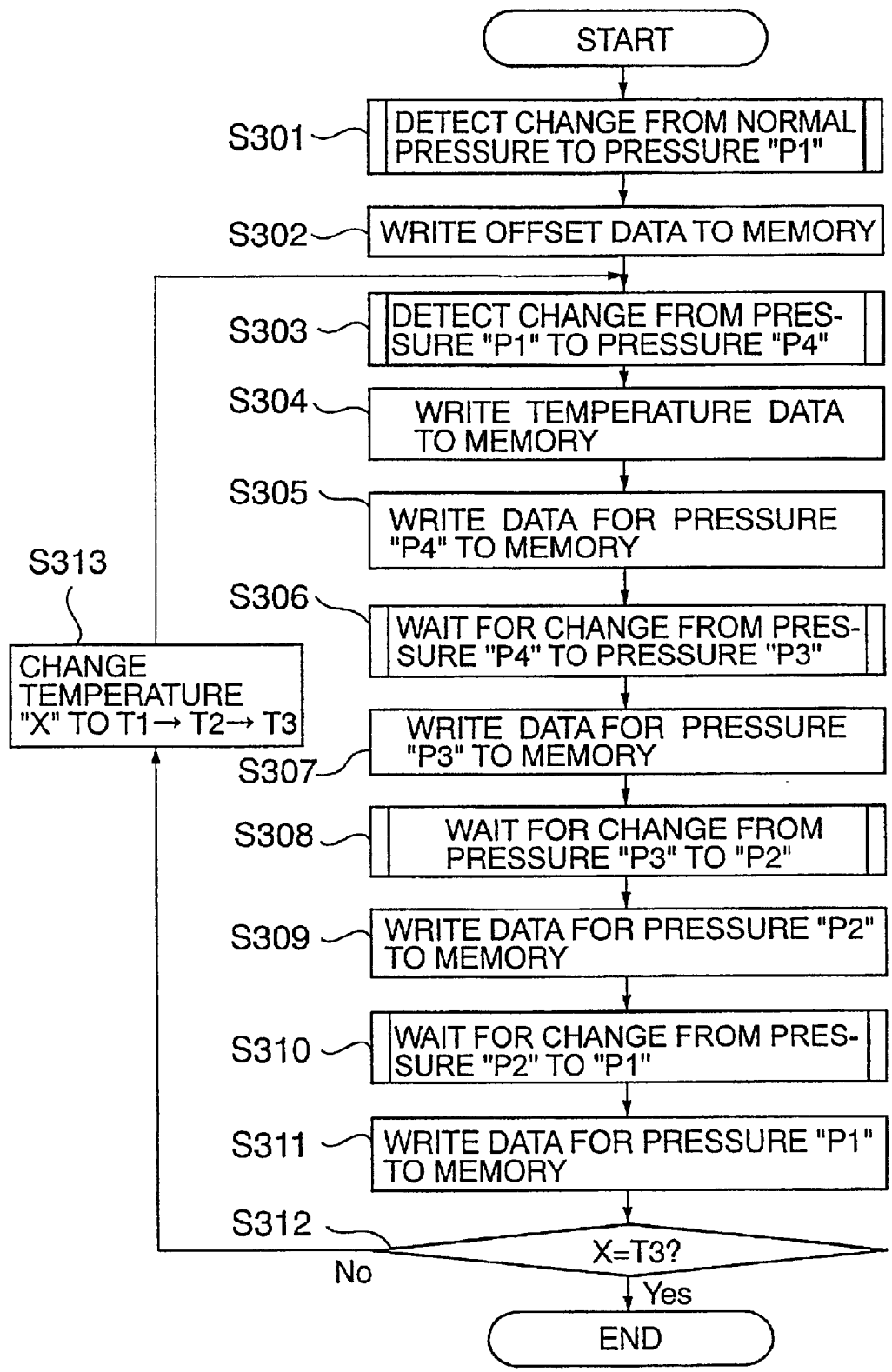
FIG. 14 is a flowchart showing a calibration control processing procedure of the calibration control unit.

Next, a description is given, with reference to the flow-charts shown in FIG. 13 and FIG. 14, of the control processing procedure of the thermostatic constant-pressure control unit 12 and the calibration control processing procedure of the calibration control unit 5 during calibration. In FIG. 13, the thermostatic constant-pressure control unit 12 is set to a temperature "T1"° C. and a pressure "P1" hPa (step S201), i.e. to the lowermost temperature and the lowermost pressure.

On the other hand, the calibration control unit 5 detects a change from a normal pressure to a pressure "P1" hPa by detecting a sensor output from the pressure sensor 1 (step S301) and the offset data at this time is written to memory, i.e. to the storage unit 3 (step S302).

The thermostatic constant-pressure control unit 12 then carries out the process of step S204 to S212 with respect to the temperature "T1"° C. (step S203) as a result of the writing to the memory ending (step S302). The pressure is then raised in this process at one time up to a pressure "P4" hPa at a constant temperature "T1"° C., and the pressure is then gradually lowered to the pressures "P3" to "P1" hPa (step S204, S206, S208 and S210). During this time, the transition to each pressure change is carried out each time from the completion of writing from the calibration control unit 5 to memory (step S205, S207, S209, S211).

During this time, the calibration control unit 5 carries out pressure sensitivity adjustment at a fixed temperature of "T1", i.e. the calibration control unit 5 writes temperature data to memory (step S304) when the pressure sensor 1 detects a change in pressure from "P1" to "P4" (step S303), and data for the pressure "P4" is written to memory (step S305). When there is a change thereafter from pressure "P4" to "P3" (step S306), data for the pressure "P3" is written to memory (step S307). When there is a further change thereafter from pressure "P3" to "P2" (step S308), data for the pressure "P2" is written to memory (step S309). A further change thereafter from pressure "P2" to "P1" (step S310), means that data for the pressure "P1" is then written to memory (step S309). A determination is then made based on the output of the pressure sensor 1 as to whether or not processing of the lowest temperature, i.e. processing of the final temperature "T3"° C. is complete (step S312). When it is not complete (NO in step S312), the temperature is changed in the order "T1" ? "T2" ? "T3" (step S313), and step S303 is proceeded to. On the other hand, when it is determined that processing is complete for the final temperature "T3"° C. (YES in step S312), the process is complete, i.e. the calibration process is complete. On the other hand, the thermostatic constant-pressure control unit 12 determines in step S212 whether or not control of settings for the temperature "T3"° C. is complete. If this is not the case (NO in step S212), the temperature is changed in the order of T1-T2-T3 (step S213), step S203 is proceeded to, and the pressure is changed under the set temperature. On the other hand, when control of setting with respect to the temperature "T3"° C. is complete (YES in step S212), the temperature and pressure is returned to normal (step S214) and the process is then complete.

In this manner the calibration control unit 5 detects changes in pressure based on the output of the pressure sensor 1 and uses the detection of this change in pressure as a trigger to carry out calibration processing, with the result that control of the settings occurring at the thermostatic constant-pressure control unit 12 is carried out in synchronism. The calibration processing is then performed and the compensation data is stored in the storage unit 3. The confirmation of settings step is then performed in calibration mode. The sensor timepiece then proceeds to application mode as a result of switching by the mode controller 7, and a state of normal utilization employing the application controller 4 is entered.

In the above calibration process, compensation data is stored in the storage unit 3 but the present invention is by no means limited in this respect and it is also possible to store correction conversion data including compensation data directly. Correction conversion data is data on which correction is complete which can be converted immediately together with the sensor input for displaying at display unit 6.

In the first embodiment, calibration for all of the sensor timepieces can be carried out at one time by arranging a plurality of sensor timepieces to be set in calibration mode in the thermostatic constant-pressure tank body 11 and by controlling settings for temperature and pressure using the calibration control unit 5. In particular, compensation data or correction conversion data compensation for individual differences in the pressure sensors 1 of each sensor timepiece can be held and highly precise sensor detection can be performed.

Second Embodiment

Next, a description is given of a second embodiment of the present invention. The first embodiment was implemented based on a straightforward calibration process and highly precise sensor detection. However, in the second embodiment, a time and date are also set when carrying out calibration processing, thus reducing the time required for an operator to set the time and date, and avoiding human error when setting the time and date.

Figure 15:
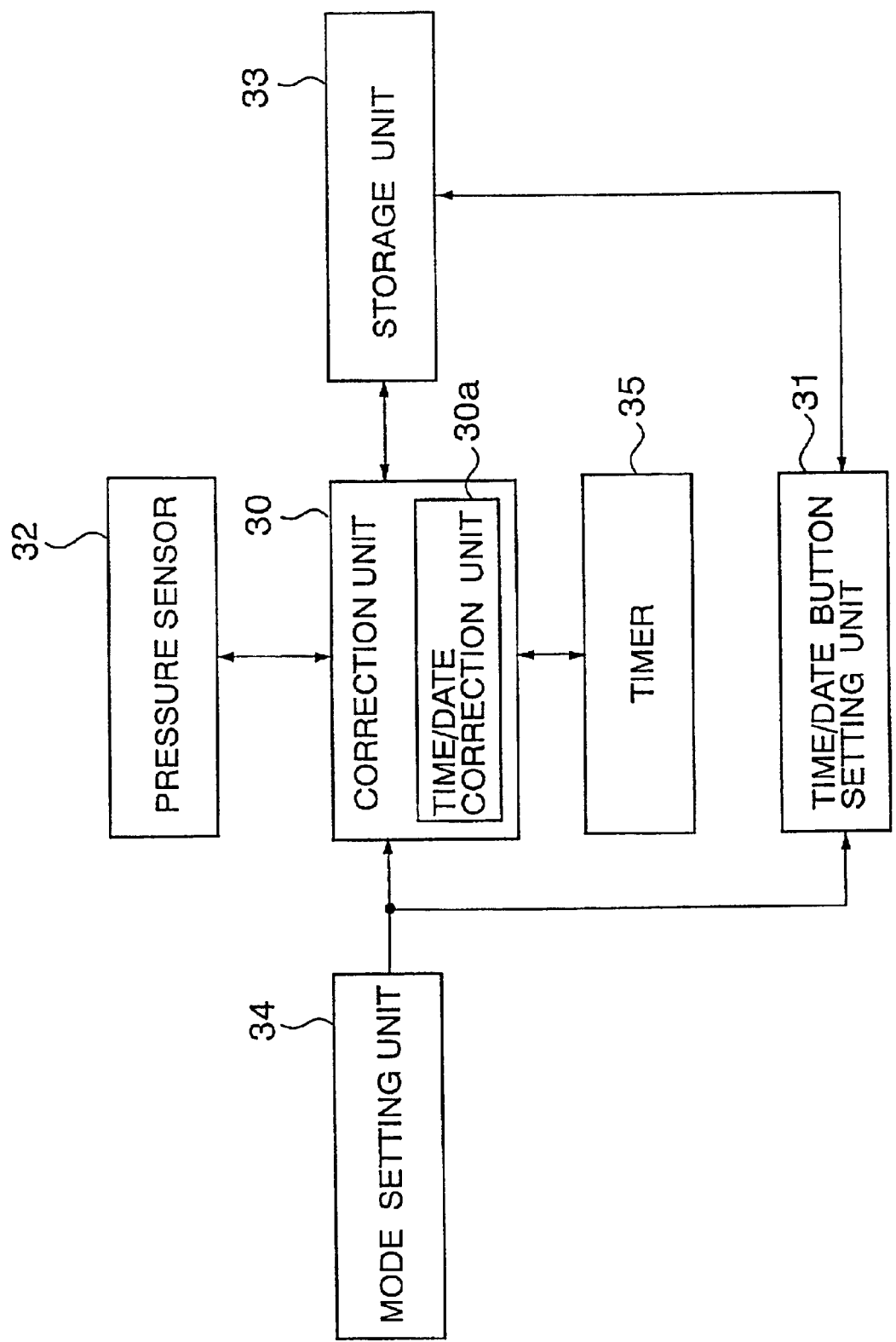
FIG. 15 is a block diagram showing a configuration of a sensor timepiece of a second embodiment.

FIG. 15 is a block diagram showing a configuration of a sensor timepiece of a second embodiment of the present invention. The sensor timepiece shown in FIG. 15 comprises a time/date button setting unit 31, having buttons (not shown), for setting a time and a date based on button operations, a pressure sensor 32, a storage unit 33 for storing a calibration program for executing calibration of the output of the pressure sensor 32 and a confirmation program for confirming values measured after correction, a mode setting unit 34 for setting a calibration mode which causes calibration to start and a mode for setting a time and date, a timer 35 for measuring time, and a correction unit 30, taking an output of the pressure sensor 32 and time information from the timer 35 as input, and calculating measurement value correction coefficients (corresponding to compensation data) in accordance with a calibration program stored in the storage unit 33 and an external calculation program within a correction calculation unit 45 to be described later. The correction unit 30 also has a correction unit 30a for confirming time and date settings and measured valued based on the output of the pressure sensor 32 in accordance with a settings confirmation program.

Figure 16:
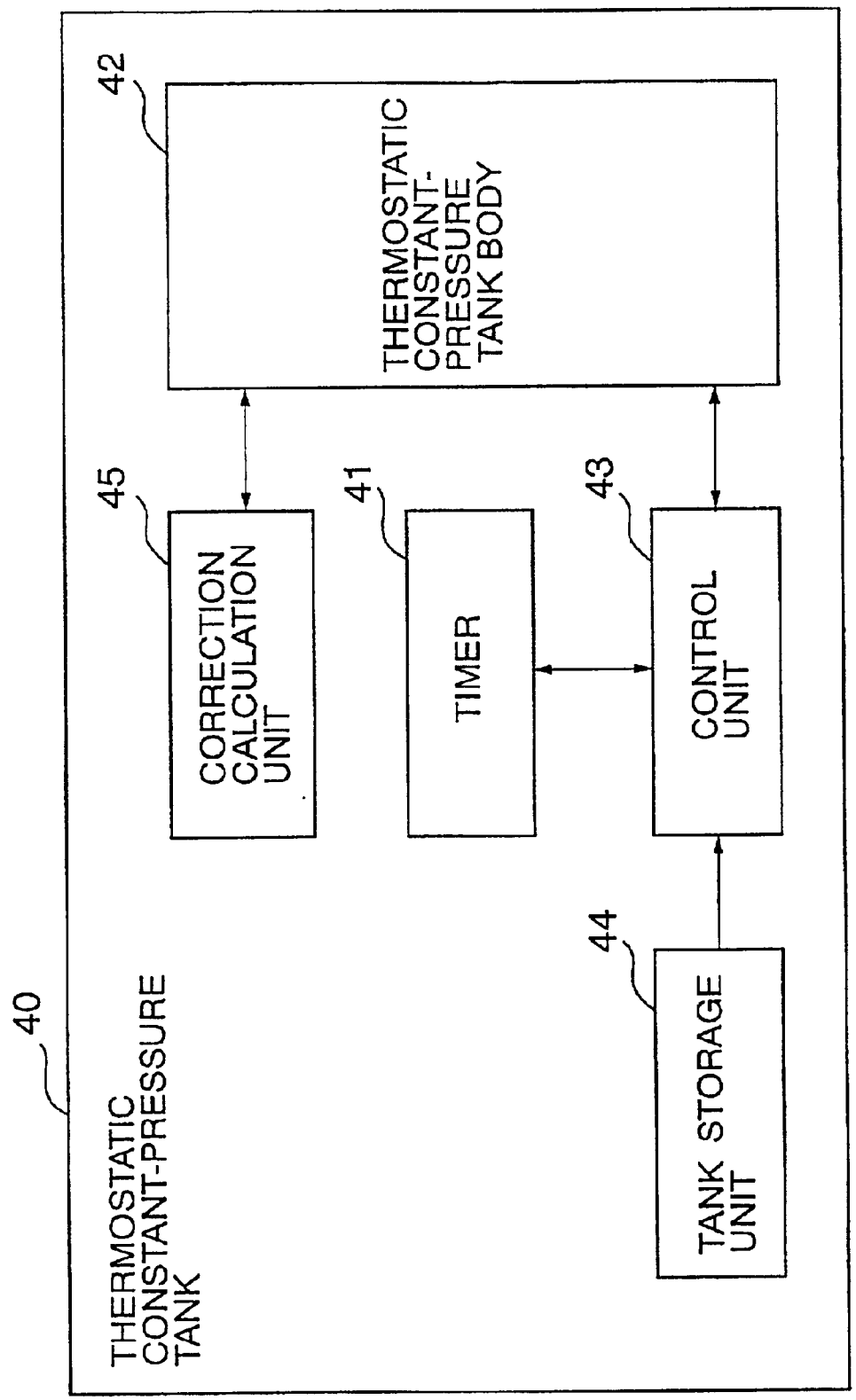
FIG. 16 is a block diagram showing the configuration of a thermostatic constant-pressure tank employed in a process for manufacturing the sensor timepiece of the second embodiment.

FIG. 16 is a block diagram showing the configuration of a thermostatic constant-pressure tank employed in a process for manufacturing the sensor timepiece of the second embodiment. A thermostatic constant-pressure tank 40 of the second embodiment is equipped with a timer 41 for measuring the time and date. A tank storage unit 44 stores a tank settings confirmation program for a calibration step and a settings confirmation step described later.

A control unit 43 takes time and date data from the timer 41 as input and controls pressure and temperature within a thermostatic constant-pressure tank body 42 according to a tank settings confirmation program stored in the tank storage unit 44. The correction calculation unit 45 has calculating means working in unison with the calibration program within the timepiece for calculating correction coefficients. The thermostatic constant-pressure tank 40 of the second embodiment corresponds to the control means of the present invention.

Figure 17:
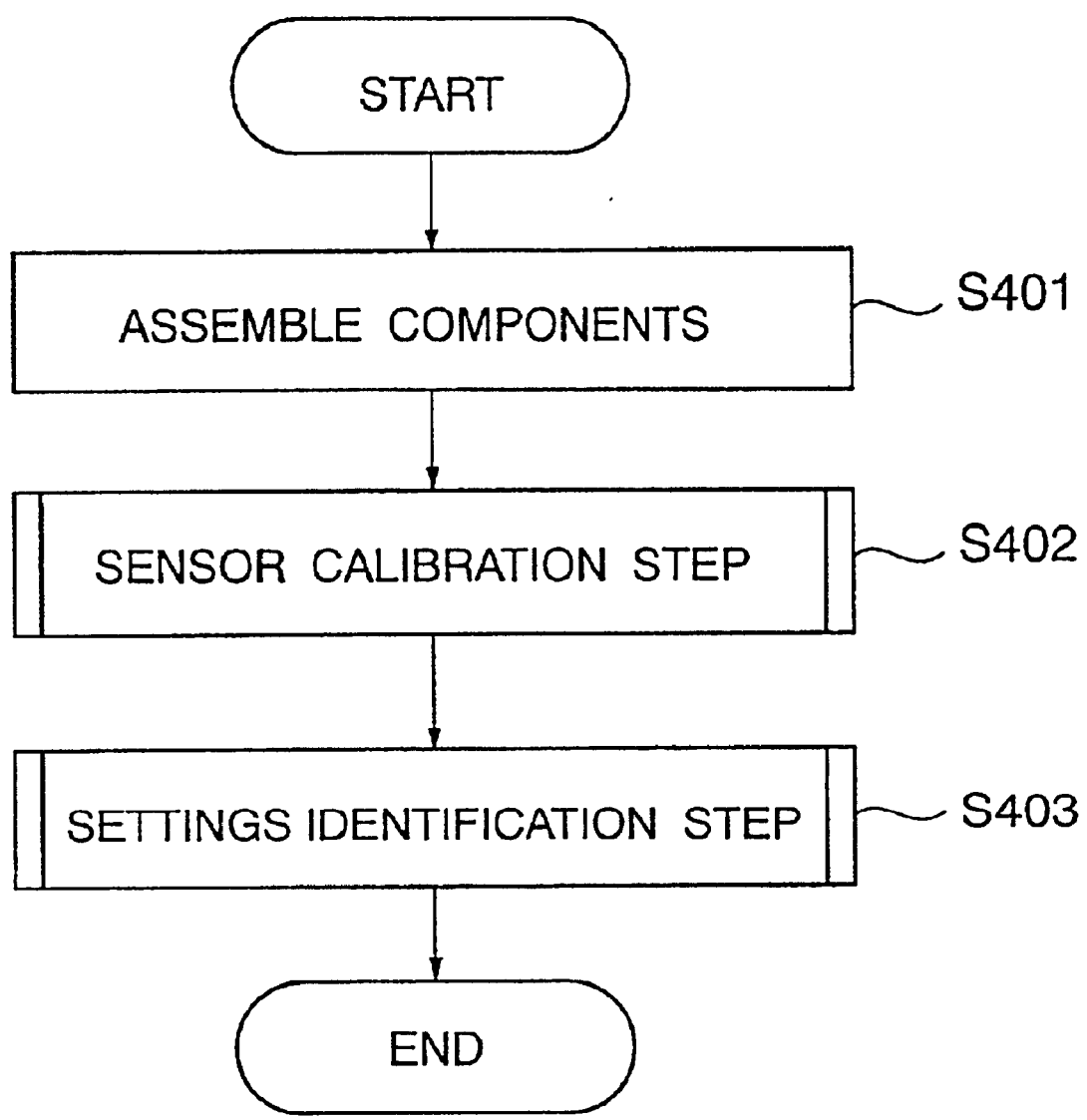
FIG. 17 is a flowchart of a manufacturing process of the second embodiment.

The operation of the second embodiment of the above construction will now be described with reference to FIG. 17 to FIG. 19. FIG. 17 is a flowchart of a manufacturing process of the second embodiment. In the manufacturing process of the second embodiment, a calibration step is performed (step S402) after completely assembling the sensor timepiece (S401). A determination is then made as to whether or not the corrected measured values are accurate, a settings confirmation step (S403) is executed to set the time and data, and the manufacturing process is complete.

In the calibration step, first, the operator sets the sensor timepiece to calibration mode and puts the sensor timepiece into the thermostatic constant-pressure tank body 42. The thermostatic constant-pressure tank 40 is then operated and the tank settings confirmation program is commenced.

Setting of the date and time is executed in the calibration mode of the second embodiment. In other words, the calibration mode of the second embodiment is a mode for setting the date and time. It is preferable that setting of the timepiece in the calibration mode is achieved by a special operation that makes the calibration mode difficult to set accidently so that a user does not mistakenly set the timepiece in the calibration mode.

The control unit 43 controls pressure and temperature within the thermostatic constant-pressure tank body 42 in accordance with a program within the mode setting unit 34. Correction coefficients are then calculated by a calibration program within the timepiece and calculating means within the correction calculation unit 45 based on the output of the pressure sensor 32 for certain set values, the coefficients are stored, and calibration is performed.

Figure 18:
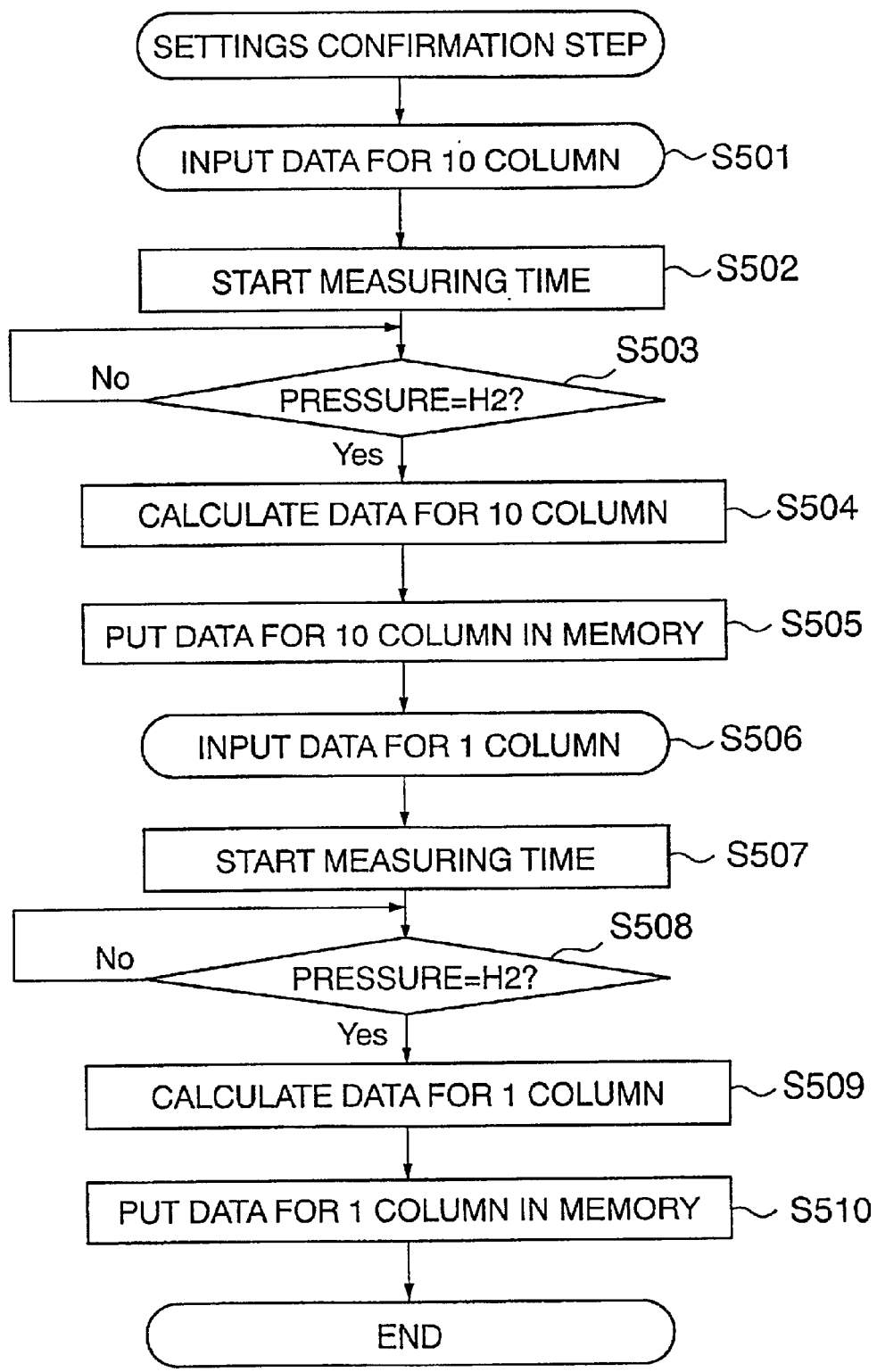
FIG. 18 is a flowchart of a process for confirming settings of the second embodiment.
Figure 19:
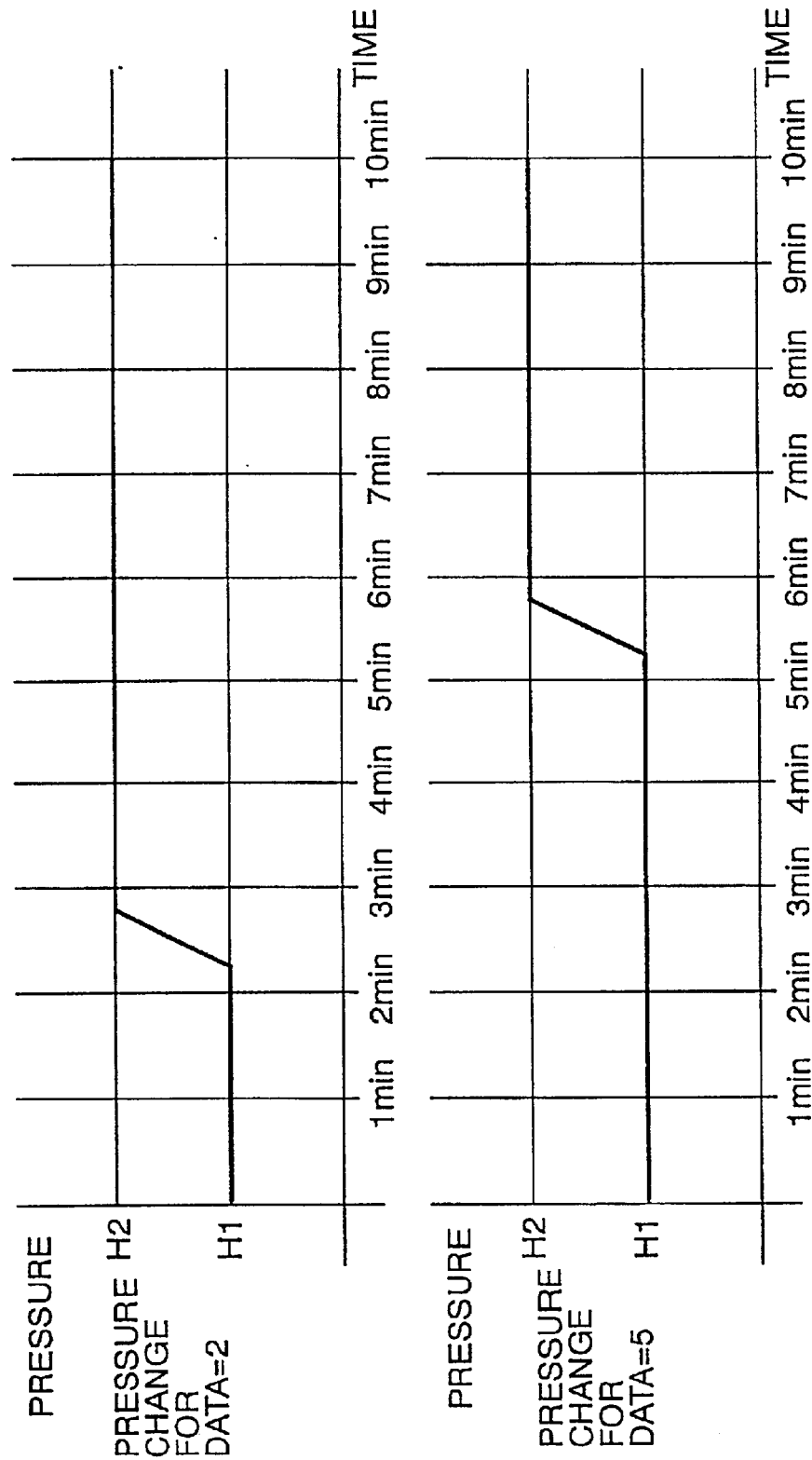
FIG. 19 is a graph showing change in pressure within the thermostatic constant-pressure tank occurring in the process for confirming settings in the second embodiment.

FIG. 18 is a flowchart showing a settings identification step of the second embodiment, and FIG. 19 is a graph showing changes in pressure within the thermostatic constant-pressure tank body 42 of the second embodiment. When the calibration step ends, the settings confirmation step commences. A description is given of an example of inputting two digits of data for setting the time and date to keep the description simple.

For example, when data is inputted split up into year data for setting the date and data for setting the time, when data for the 10 column is input (step S501), this is executed in an order starting from the input for the 1 column (step S506). With the data input for the 10 column, as shown in FIG. 19, the control unit 43 first puts the pressure within the thermostatic constant-pressure tank body 42 to a preset value of H1. Date data for, for example, the year, is then inputted from the timer 41, and a time proportional to the value for the 10 column of this data is taken as the time. For example, when the value of the 10 column is 2, two seconds is taken as the time, and the pressure is held at H1.

The time/date correction unit 30a of the correction unit 30 takes time information from the timer 35 and the output of the pressure sensor 32 as input, and starts to measure time (step S502) when the pressure within the thermostatic constant-pressure tank body 42 becomes H1. The control unit 43 then puts the pressure within the thermostatic constant-pressure tank body 42 to a preset value of H2 after the pressure has been held at H1 for two seconds.

The time/date correction unit 30a then determines whether or not the pressure within the thermostatic constant-pressure tank body 42 is H2 (step S503). When the pressure within the thermostatic constant-pressure tank body 42 is H2, the time/date correction unit 30a stops measuring the time, data for the 10 column from the start of measuring is calculated (step S504), and the calculated 10 column data is stored in the 11 storage unit 3 (step S505).

Inputting of data for the 1 column then commences (step S506). The control unit 43 again puts the pressure within the thermostatic constant-pressure tank body 42 to H1, and, as in the case of the 10 column data input, takes data from the timer 41 as input, and holds the pressure at H1 for a time proportional to the value of the 1 column for this data, i.e. holds the pressure H1 for 5 seconds if the value of the 1 column is 5.

The time/date correction unit 30a of the correction unit 30, as with the case of input of data for the 10 column, takes time information from the timer 35 and the output of the pressure sensor 32 as input, and starts to measure time (step S507) when the pressure within the thermostatic constant-pressure tank body 42 becomes H1. The control unit 43 then puts the pressure within the thermostatic constant-pressure tank body 42 to H2 after the pressure has been held at H1 for five seconds.

The time/date correction unit 30a then determines whether or not the pressure within the thermostatic constant-pressure tank body 42 is H2 (step S508). When the pressure within the thermostatic constant-pressure tank body 42 is H2, the time/date correction unit 30a stops measuring the time, data for the 1 column from the start of measuring is calculated (step S509), and the calculated 1 column data is stored in the 11 storage unit 33 (step S510).

The sensor timepiece compares the measured values and the values of H1 and H2 at the same time as setting the time and date, and determines whether or not the measured values are accurate.

According to the second embodiment, the thermostatic constant-pressure tank 40 controls the range of pressure for the sensor timepiece based on the date and time set and the sensor timepiece detects the range of pressure and sets the time and date based on the detection signal. It is therefore not necessary for an operator to operate buttons in order to set the time and date in the manufacturing process, manufacturing costs are reduced, and the likelihood of the time and date being erroneously set is reduced.

Third Embodiment

Next, a description is given of a third embodiment of the present invention. The sensor timepiece and thermostatic constant-pressure tank of the third embodiment have the same configuration as the sensor timepiece and thermostatic constant-pressure tank of the second embodiment, as well as the same operation, with only the settings confirmation step being different. Portions that are the same as for the second embodiment are given the same numerals. Here, a description is given only of the portions of the settings confirmation step that are different, using FIG. 20 and FIG. 21.

Figure 20:
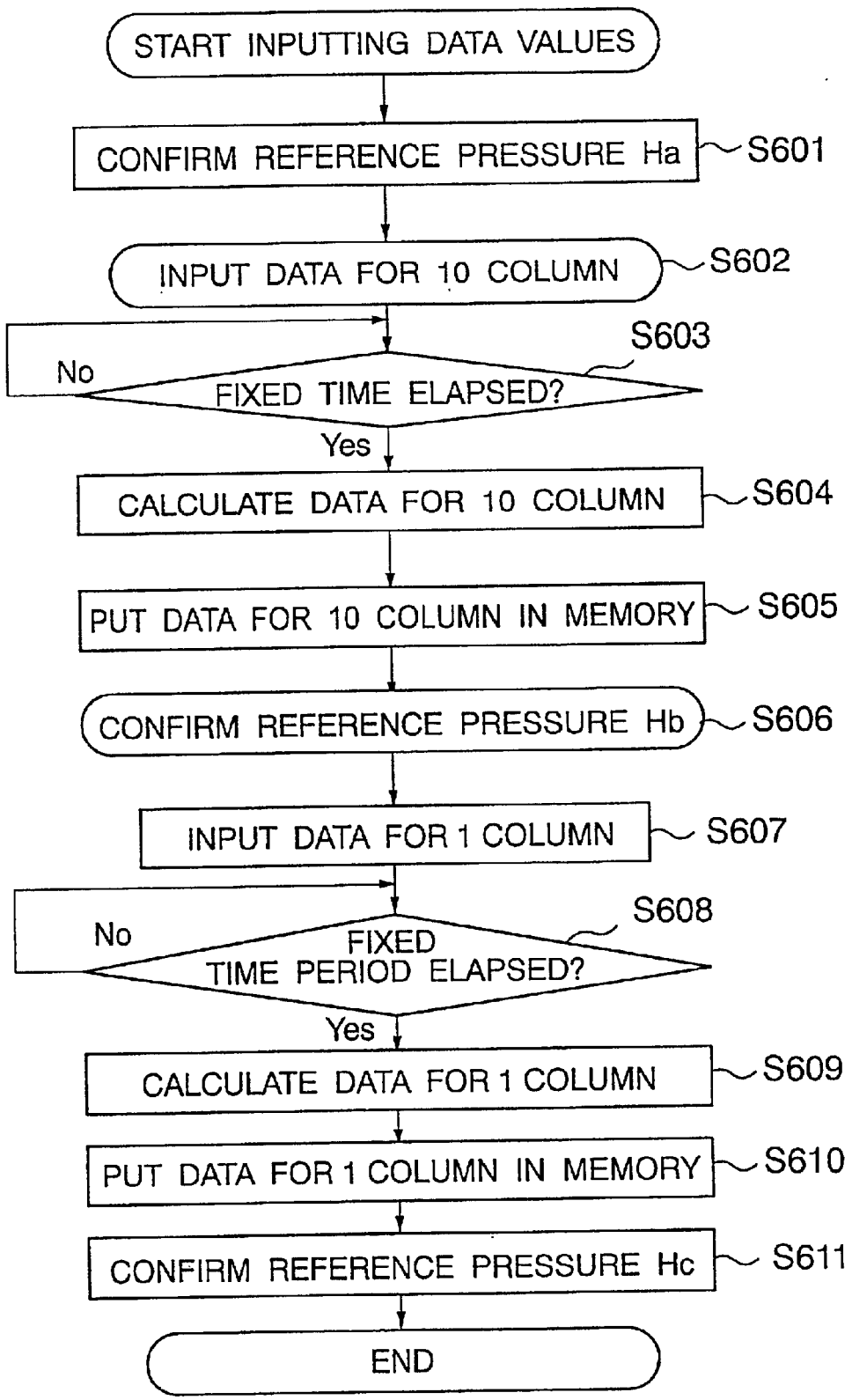
FIG. 20 is a flowchart of a process for confirming settings of a third embodiment.
Figure 21:
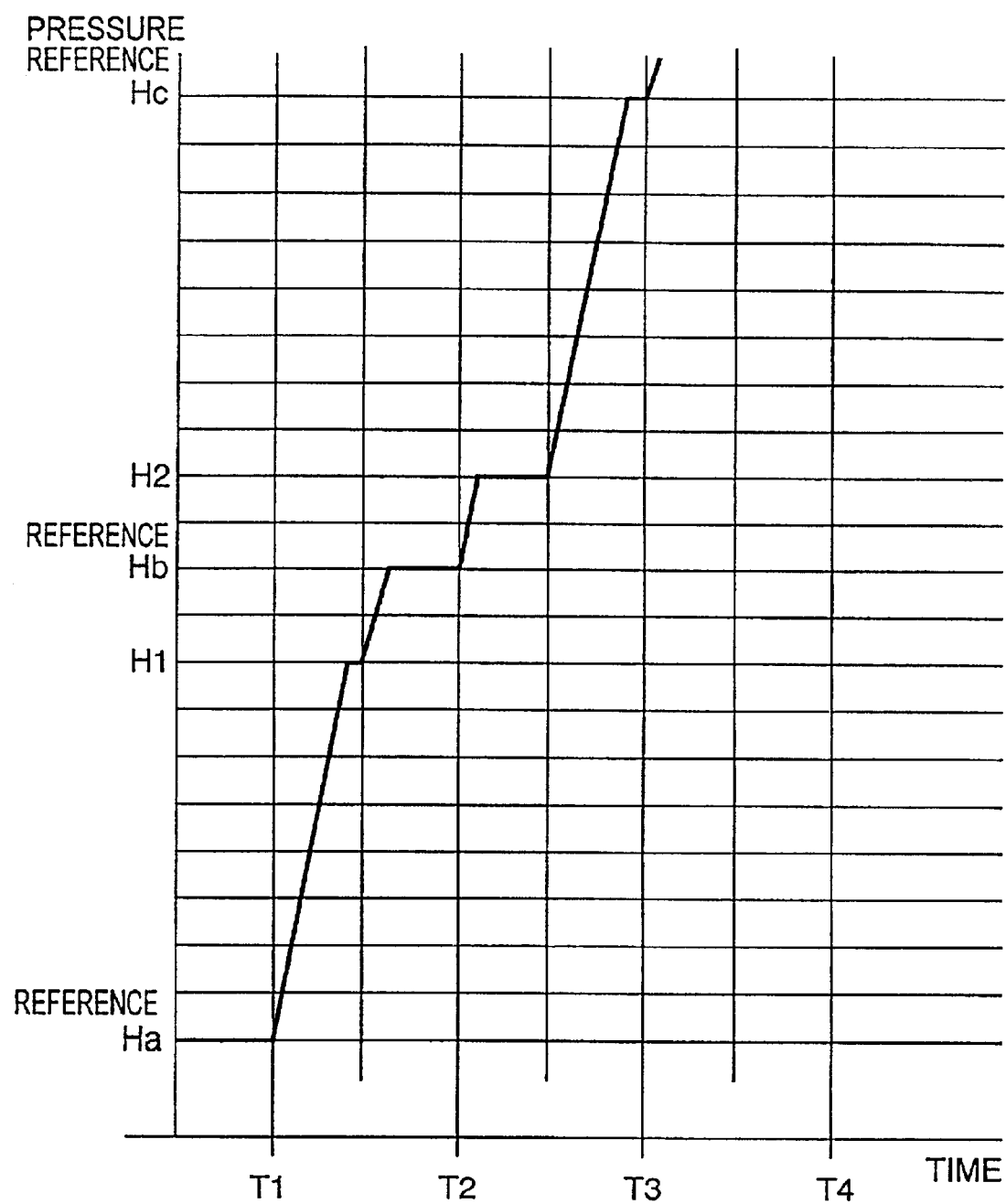
FIG. 21 is a graph showing change in pressure within the thermostatic constant-pressure tank occurring in a process for confirming settings in the third embodiment.

FIG. 20 is a flowchart showing a settings identification step of the third embodiment, and FIG. 21 is a graph showing changes in pressure within the thermostatic constant-pressure tank body 42 of the third embodiment. In the setting confirmation step of the third embodiment, the control unit 43 takes, for example, year data of the date data as input from the timer 41 and controls pressure within the thermostatic constant-pressure tank body 42 as shown in FIG. 21. Here, Ha, Hb and Hc are reference pressures for confirming the measured values and inputting data, and H1 and H2 are the pressure outputted for the data for the 1 column and pressure outputted for the data for the 10 column, respectively.

The time/date correction unit 30a takes a sensor output from the pressure sensor 32 and time information from the timer 35 as input, and when the reference pressure Ha is detected (in step S601), starts measuring the time and starts input of data for the 10 column. After the start of data input, the time measured is confirmed, and a determination is made as to whether or not a preset fixed period of time has elapsed (step S603). When a fixed time passes, the sensor output is inputted, 10 column data is calculated (step S604) from the value for the inputted sensor output, and the calculated 10 column data is stored in the storage unit 33.

When the reference pressure Hb is detected (step S606), input of data for the 1 column is commenced (step S607). It is then determined whether or not a fixed period of time has elapsed since the start of inputting of data for the 1 column (step S608). When a fixed time passes, the sensor output is inputted, 1 column data is calculated (step S609) from the value for the inputted sensor output, and the calculated 1 column data is stored in the storage unit 33 (step S611).

The sensor timepiece compares the measured values and the values for the reference pressures Ha, Hb and Hc at the same time as setting the time and date and determines whether or not the measured values are accurate.

According to the third embodiment, the input of time and date data is carried out from the values of the sensor output and the same effects as for the second embodiment are obtained.

Figure 22A:
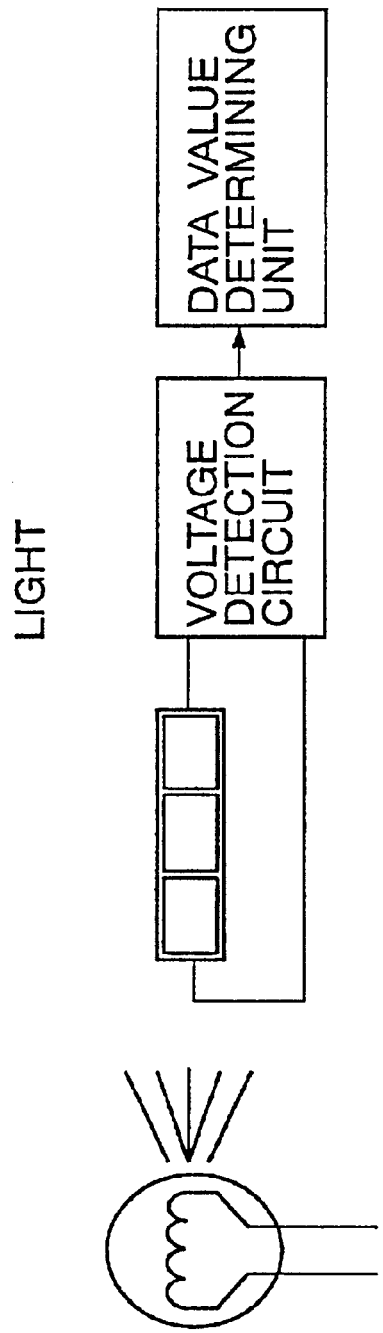
FIG. 22 is a view illustrating an example of a third sensor relating to the first to third embodiments.
Figure 22B:
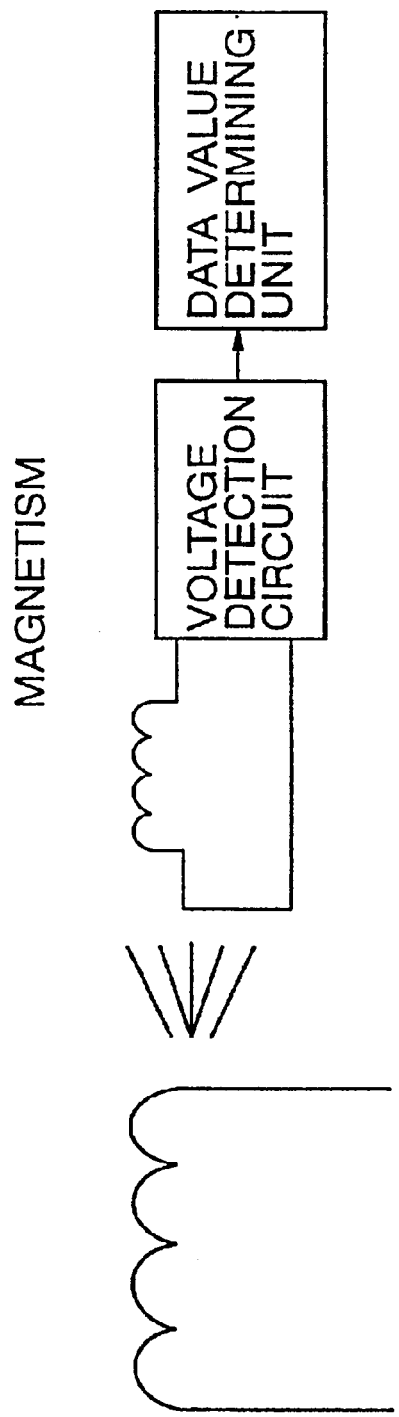

In the second and third embodiments an example is given of a sensor timepiece having a pressure sensor, but a sensor timepiece having an optical sensor or magnetic sensor as shown in FIG. 22(a) and FIG. 22(b), or a sensor timepiece having a temperature sensor or humidity sensor (not shown) is also possible.

Further, the data is by no means limited to time and date, and other data can also be inputted.

In the second and third embodiments, the settings confirmation step is carried out so as to continue on from the calibration step, but it is also possible to independently execute just steps for carrying out processing relating to setting of the time and date during the settings confirmation process by providing an independent mode for setting the time and date.

Combining the first embodiment with the second and third embodiments is also possible.

INDUSTRIAL APPLICABILITY

According to the sensor timepiece described above, the calibration control means controls writing of detection values of the sensor to memory in synchronism with the external environmental setting control means for controlling an external environment corresponding to physical quantities to be measured by the sensor. Reduction in the detection precision of the sensors due to variation in the sensors of the sensor timepieces can therefore be avoided, the time and labor taken up by the calibration process can be reduced and a highly precise sensor timepiece can be provided.

According to this sensor timepiece, the calibration control means controls the writing of detection values of the sensor to read/writable non-volatile memory so that this data can continue to be used as compensation data even after changing a battery.

According to this sensor timepiece, the operation control means converts values detected by the sensors into physical quantities based on the compensation data or the correction conversion data for output so as to give a highly precise compensation output. This means that a sensor timepiece with a highly precise sensor output can be provided.

According to this sensor timepiece, the mode control means controls switching over between an operation mode for performing normal operations including conversion and output of physical quantities by the operation control means, and a calibration mode where the calibration control means performs calibration operations. This means that switching between both of the operation programs built into the sensor timepiece can be controlled in an effective manner.

According to this sensor timepiece, the time/date setting means takes detection signals detected by the sensor(s) as input, and sets a time and/or a date based on the inputted detection signal(s). The amount of time and labor required to set the time and date is therefore reduced, production costs can be reduced, and people can be prevented from incorrectly setting the time and date.

Further, according to this sensor timepiece, the time/date setting means, in parallel with the calibration operation by the calibration control means or before and/or after the calibration operation, generates time and/or date data based on a signal detected by the sensor, and sets the time and/or date. The amount of time and labor required to carry out the calibration process and set the time and date is therefore reduced, a highly precise sensor output can be obtained, and people can be prevented from incorrectly setting the time and date.

Moreover, according to this sensor timepiece, the time/date setting means takes detection signals detected by the sensor(s) as input and sets a time and/or a date based on the inputted detection signal(s). The time and labor required to set the time and date is therefore reduced and people are prevented from performing setting incorrectly.

Still further, according to this sensor timepiece, the mode setting means sets a mode for setting a time and/or a date, and the time/date setting means generates time or date data based on detection signals detected by the sensor when a mode is set by the mode setting means. The time and labor required to set the time and date is therefore reduced and people are prevented from performing setting incorrectly.

Further, according to this sensor timepiece data input system, the external environmental setting control device controls the setting of the external environment, and the sensor timepiece calibration control means ensures that detection values of the sensor are written to memory in synchronism with changes in physical quantities, the setting of which is controlled by the external environmental setting control device. The time and labor taken up by the calibration process can be reduced and a highly precise sensor timepiece can be provided. Further, adjustment costs are reduced because calibration is carried out at the sensor timepiece unit. According to this sensor timepiece data input system, the control means controls at least one of the physical quantities measured by the sensor timepiece based on the set time and date and sets the time and date of the sensor timepiece, and the sensor timepiece time/date setting means takes detection signals detected by the sensor as input and sets the time and data based on the inputted detection signals. The time and labor required to set the time and date is therefore reduced and people are prevented from performing setting incorrectly.

Further, according to this sensor timepiece data input method, writing of detection values detected by a sensor to memory is controlled in a writing control step in synchronism with changes in physical quantities of an external environment set and controlled by an external environmental setting control device, and compensation data is generated from the contents of the memory and current detection values of the sensor in a calculating step, so that a highly precise sensor timepiece can be implemented.

Moreover, control is exerted in the physical quantity control step in such a manner that at least one of the physical quantities measured by the sensor is measured based on the set time and date. The physical quantity controlled in the physical quantity control step is then detected on the sensor timepiece side in the detection step. The time and date are then set on the sensor timepiece side based on the detection results of the detection step in the time/date setting step. The time and labor required to set the time and date is therefore reduced and people are prevented from performing setting incorrectly.

Here, a program for executing the aforementioned methods is recorded on a computer-readable recording medium of the present invention. The time and labor taken up by the calibration process can be reduced, a highly precise sensor timepiece can be provided, the time and labor required to set the time and date is therefore reduced and people are prevented from performing setting incorrectly.

What is claimed is:

1. A sensor timepiece comprising: at least one sensor for measuring one or more environmental conditions external to the timepiece; a memory for storing output values of the at least one sensor; environmental setting control means used to control a calibration apparatus for calibration of the timepiece by controlling the external environment of the timepiece corresponding to the environmental conditions measured by the at least one sensor; and calibration control means for controlling the writing of output values of the at least one sensor to the memory in synchronism with operation of the external environmental setting control means.

2. A sensor timepiece according to claim 1; wherein the calibration control means controls the writing of output values of the at least one sensor to the memory for each of a plurality of external temperature values.

3. A sensor timepiece according to claim 2; further comprising operation control means for generating temperature compensation data based on the data written to the memory, current temperature data, and sensor output values, and converting the sensor output values to physical quantities for output.

4. A sensor timepiece according to claim 3; further comprising mode control means for controlling switching over between an operation mode in which normal operations are performed, including conversion and output of measured environmental conditions by the operation control means, and a calibration mode in which the calibration control means performs calibration operations.

5. A sensor timepiece according to claim 4; further comprising time/date setting means for receiving output signals of the one or more sensors and setting at least one of a time and a date based on the received output signals.

6. A sensor timepiece according to claim 5; wherein the time/date setting means generates at least one of time and date data for setting the time and date of the sensor timepiece based on an output signal of the at least one sensor before, after, or in parallel with calibration operations performed by the calibration control means.

7. A sensor timepiece according to claim 6; wherein the mode control means has mode setting means for setting a time/date setting mode; and the time/date setting means generates time and date data and sets a time and date based on output signals of the one or more sensors when the time/date setting mode is set by the mode setting means.

8. A sensor timepiece according to claim 1; further comprising operation control means for generating temperature compensation data based on the data written to the memory, current temperature data, and sensor output values, and converting the sensor output values to physical quantities for output.

9. A sensor timepiece according to claim 8; further comprising mode control means for controlling switching over between an operation mode in which normal operations are performed, including conversion and output of measured environmental conditions by the operation control means, and a calibration mode in which the calibration control means performs calibration operations.

10. A sensor timepiece according to claim 9; further comprising time/date setting means for receiving output signals of the one or more sensors and setting at least one of a time and a date based on the received output signals.

11. A sensor timepiece according to claim 10; wherein the time/date setting means generates at least one of time and date data for setting the time and date of the sensor timepiece based on an output signal of the at least one sensor before, after, or in parallel with calibration operations performed by the calibration control means.

12. A sensor timepiece according to claim 11; wherein the mode control means has mode setting means for setting a time/date setting mode; and the time/date setting means generates time and date data and sets a time and date based on output signals of the one or more sensors when the time/date setting mode is set by the mode setting means.

13. A sensor timepiece according to claim 1; further comprising time/date setting means for receiving output signals of the one or more sensors and setting at least one of a time and a date based on the received output signals.

14. A sensor timepiece comprising: at least one sensor for measuring one or more environmental conditions external to the timepiece; environmental setting control means used to control a calibration apparatus for calibration of the timepiece by controlling the external environment of the timepiece corresponding to the environmental conditions measured by the at least one sensor; calibration control means for controlling the writing of output values of the at least one sensor in synchronism with operation of the external environmental setting control means; and time/date setting means for receiving output values of the at least one sensor and setting a time and a date of the timepiece based on the received output values of the at least one sensor.

15. A sensor timepiece data input system comprising: a sensor timepiece having an external environmental setting control device for controlling a calibration apparatus used to calibrate the timepiece by controlling the setting of environmental conditions external to the timepiece, at least one sensor for detecting one or more external environmental conditions, and a memory for storing output values of the at least one sensor; and calibration control means for controlling the writing of output values of the at least one sensor to the memory in synchronism with changes in the external environment set and controlled by the external environmental setting control device.

* * * * *